United States Patent
Yao et al.

(10) Patent No.: US 8,364,962 B2
(45) Date of Patent: Jan. 29, 2013

(54) COMMUNICATION DATA FRESHNESS CONFIRMATION SYSTEM

(75) Inventors: Taketsugu Yao, Osaka (JP); Kiyoshi Fukui, Mie (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 260 days.

(21) Appl. No.: 12/801,446

(22) Filed: Jun. 9, 2010

(65) Prior Publication Data

US 2011/0066856 A1    Mar. 17, 2011

(30) Foreign Application Priority Data

Sep. 17, 2009   (JP) ................................. 2009-215864

(51) Int. Cl.
*G06F 21/00* (2006.01)
(52) U.S. Cl. ............ 713/170; 380/251; 380/270; 726/4; 705/75; 713/168; 713/171
(58) Field of Classification Search .................. 713/170
See application file for complete search history.

(56) References Cited

U.S. PATENT DOCUMENTS

| | | | | |
|---|---|---|---|---|
| 5,673,318 | A * | 9/1997 | Bellare et al. ................. | 713/170 |
| 7,490,237 | B1 * | 2/2009 | Morais et al. ................. | 713/170 |
| 7,676,679 | B2 * | 3/2010 | Weis et al. .................... | 713/178 |
| 8,001,386 | B2 * | 8/2011 | Goodman et al. ............ | 713/180 |
| 2003/0009694 | A1 * | 1/2003 | Wenocur et al. .............. | 713/201 |
| 2003/0105964 | A1 * | 6/2003 | Brainard et al. .............. | 713/178 |
| 2004/0103282 | A1 * | 5/2004 | Meier et al. ................... | 713/171 |
| 2005/0149730 | A1 * | 7/2005 | Aissi et al. .................... | 713/168 |
| 2008/0195865 | A1 * | 8/2008 | Nikander ....................... | 713/170 |
| 2009/0082635 | A1 * | 3/2009 | Baldus et al. ................. | 600/300 |

FOREIGN PATENT DOCUMENTS

JP         2006-072970 A        3/2006

OTHER PUBLICATIONS

Dynamic On-Demand Updating of Data in Real-Time Database Systems|http://delivery.acm.org/10.1145/970000/968074/p846-gustafsson.pdf?ip=151.207.246.4&acc=ACTIVE%20SERVICE&CFID=122307564&CFTOKEN=75887400&_acm_=1349202336__79f158a203d6bd0432ce240e324835d1|Thomas Gustafsson & Jörgen Hansson|2004.*
Efficient Online Updates in Data Warehouses|http://www.cs.cmu.edu/~chensm/papers/MaSM-sigmod11.pdf|Athanassoulis et al.|2011.*

* cited by examiner

*Primary Examiner* — Taghi Arani
*Assistant Examiner* — Mahfuzur Rahman
(74) *Attorney, Agent, or Firm* — Rabin & Berdo, P.C.

(57) ABSTRACT

A receiving device sends challenge information to a transmitting device. The transmitting device initializes a time varying parameter and transmits communication data together with data derived from the challenge information to the receiving device. Subsequent communication data, if any, are then transmitted together with data derived from the time varying parameter. The receiving device uses the challenge information to verify the freshness of the communication data transmitted first, and uses the time varying parameter to verify the freshness of the subsequent communication data. Freshness can be verified without having to maintain any type of verification data during sleep periods, and without having to send a separate challenge for each data transmission.

18 Claims, 12 Drawing Sheets

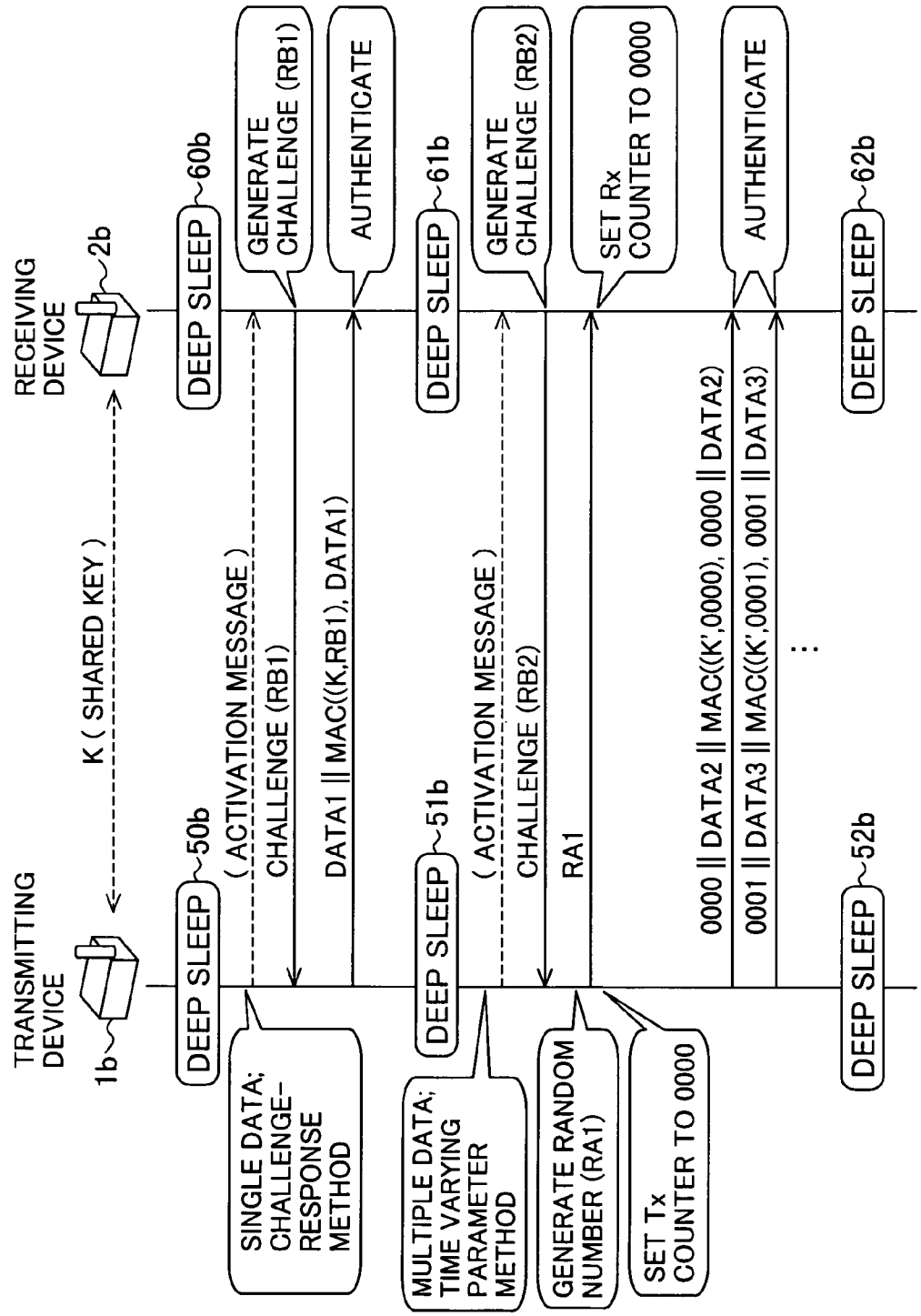

COMMUNICATION DATA FRESHNESS CONFIRMATION SYSTEM

BACKGROUND OF THE INVENTION

1. Field of the Invention

The present invention relates to a communication data freshness confirmation system for use in a communication device having a sleep state, to confirm data freshness after recovery from the sleep state as a defense against replay attacks.

2. Description of the Related Art

A replay attack is a form of network attack in which a cyber attacker intercepts transmitted data and maliciously resends the intercepted data, fooling the receiving device into treating the resent data as newly created communication data. Such replay attacks cannot be defeated simply by use of a message authentication code encrypted with a shared encryption key, because the encrypted message authentication code is also resent, and will be correctly decrypted by the receiving device.

Three other methods, using counter values, timestamps, and responses to challenges, are often employed to defend against replay attacks. These methods will be briefly described with reference to FIG. 1. The symbol '||' in FIG. 1 indicates concatenation of data. MAC(X, Y) indicates a message authentication code generated by using input data X to operate on a data string Y. The input data X may be a communication key K, an initial vector, or one or more such items.

Counter methods are used in protocols that are now widely employed by wireless networks such as portable telephone networks and wireless local area networks (wireless LANs). In the illustrated method, the transmitting device 100 and receiving device 200 maintain separate and initially equal counter values. The transmitting device 100 places its transmitting (Tx) counter value, and a message authentication code derived from that counter value, in each data transmission or message. The receiving device 200 compares the received (Tx) counter value with its own reception (Rx) counter value. The message is considered fresh if the received counter value is equal to or greater than the reception counter value. The transmission and reception counter values are incremented after each message. A separate counter value is generally maintained for each communication partner or each communication key.

Methods based on timestamps confirm freshness replace the above counter values with time values and verify freshness by synchronization of clocks between the transmitting device 100 and receiving device 200. The clocks managed separately by the transmitting device 100 and receiving device 200 may be synchronized so that their time values match, or synchronization may be based on a relative time lag between the clocks. In either case, the synchronization process must include corrections for differences in the speeds at which the clocks run, and variations in those speeds. Accurate synchronization is difficult.

In the challenge-response method, the transmitting device 100 receives challenge information from the receiving device 200, and places data derived in part from the challenge information in a message transmitted in reply to demonstrate the freshness of the message. The challenge information is a random number or other unique information that does not duplicate previously created information.

In U.S. Pat. No. 7,552,476 (Japanese Patent Application Publication No. 2006-72970), Slick et al. propose another defense against replay attacks. The receiving device stores a list of unique codes generated by the transmitting device. When the transmitting device sends the receiving device a message, it places one of the unique codes in the message. The receiving device accepts only messages including a code that matches one of the unique codes in its stored list, and deletes the matching code from its list so that the same code cannot be used again.

In wireless sensor networks and other networks in which battery-operated communication devices must operate over long periods of time, it is also important to conserve power. One effective strategy is to place the wireless communication circuits in a sleep state while waiting to receive messages from other communication devices. Known devices have various sleep modes, in which parts of the device are shut down or the internal clock of the device is slowed or stopped. In the deepest sleep mode the internal clock is stopped and all internal power is cut off, including power to volatile memory circuits such as random access memory (RAM).

A communication device that enters a sleep state may therefore lose information needed for authenticating messages. For example, counter or time values stored in volatile memory may be lost. In the following description, two sleep states will be distinguished: a deep sleep state in which authentication information is lost, and a normal sleep state in which authentication information is not lost.

In the counter methods employed in the wireless network protocols used for mobile phones, wireless LANs, and the like, information that is updated at each data transmission is often stored in RAM to provide high speed access. A communication device that has entered a normal sleep state can read the latest value of a counter it was maintaining from its own RAM after waking up, but if the device goes into a deep sleep, when it later resumes normal operation, the counter value stored in RAM will have been lost. The communication device will then have no way to tell whether data are fresh or not, and when it receives new data from a communication partner, it will be unable to confirm that it is not experiencing a replay attack.

This problem can be solved by storing counter values and other necessary authentication information in a non-volatile memory, but in general there is a limit to the number of times the data stored in a non-volatile memory can be erased and rewritten. Therefore, non-volatile memories cannot be used to store frequently updated authentication information such as counter values or lists of unused unique codes that would have to be rewritten each time the communication device was placed in the deep sleep state.

The timestamp method provides a possible solution if the timestamps are based on an external clock that continues to operate regardless of whether the communication device itself is in a sleep state or not. However, the difficult problem of synchronizing the external clocks used by different communication devices still remains.

The challenge-response method described above provides a more promising solution, because new challenges (e.g., random numbers) can be generated after recovery from a sleep state without having to store any information during the sleep period. In conventional challenge-response methods, however, a separate challenge must be issued for each message. When a communication device recovers from a deep sleep, it may have to transmit and receive a large number of messages. The large amount of accompanying challenge traffic consumes power at the transmitting and receiving devices and uses up network bandwidth resources.

There is a need for a freshness confirmation method that does not require authentication information to be stored in a non-volatile memory each time a communication device enters a sleep state, that does not require synchronization of clocks at different devices, that does not generate large quantities of additional traffic or consume extra power, and that can function efficiently in a variety of situations, including the following: transmission or reception of just one message upon recovery from the deep sleep state, followed immediately by a return to the deep sleep state; transmission of a burst of messages upon recovery from the deep sleep state, followed by a return to the deep sleep state; periodic transmission of messages after recovery from the deep sleep state, with the device being placed in the normal sleep state between messages, followed by a return to the deep sleep state when the periodic transmission has ended.

SUMMARY OF THE INVENTION

The present invention provides a novel communication data freshness confirmation system including a transmitting device and a receiving device. The receiving device transmits challenge information to the transmitting device. The transmitting device responds by initializing a time varying parameter and transmitting communication data together with data derived from the challenge information and/or the time varying parameter to the receiving device. Alternatively, the transmitting device may also respond to the challenge by sending the receiving device a message including a new starting value of the time varying parameter, or information from which a new key can be generated.

The receiving device uses at least the challenge information to verify the freshness of the communication data or message transmitted first, and uses at least the time varying parameter to verify the freshness of communication data transmitted after the first communication data or message, updating the time varying parameter from one data transmission to the next. Data can be transmitted an arbitrary number of times in response to a single challenge, the updated time varying parameter providing proof of freshness of the second and subsequent transmissions.

As a result, even if time varying parameters are deleted or reset when a communication device enters the deep sleep state, the communication device can continue communicating after recovery from the deep sleep state, and can present evidence of the freshness of its communication data, without having to store time varying parameter information in a non-volatile memory before entering the deep sleep state, and without having to receive a challenge before every message sent after recovery from the deep sleep state. The novel freshness confirmation system is also flexible in that data freshness can be confirmed in different ways depending on the amount of data to be transmitted following recovery from the sleep state.

BRIEF DESCRIPTION OF THE DRAWINGS

In the attached drawings:

FIG. 13 is a diagram illustrating the operation of the third embodiment after the communicating devices emerge from a deep sleep.

DETAILED DESCRIPTION OF THE INVENTION

Figure 1:
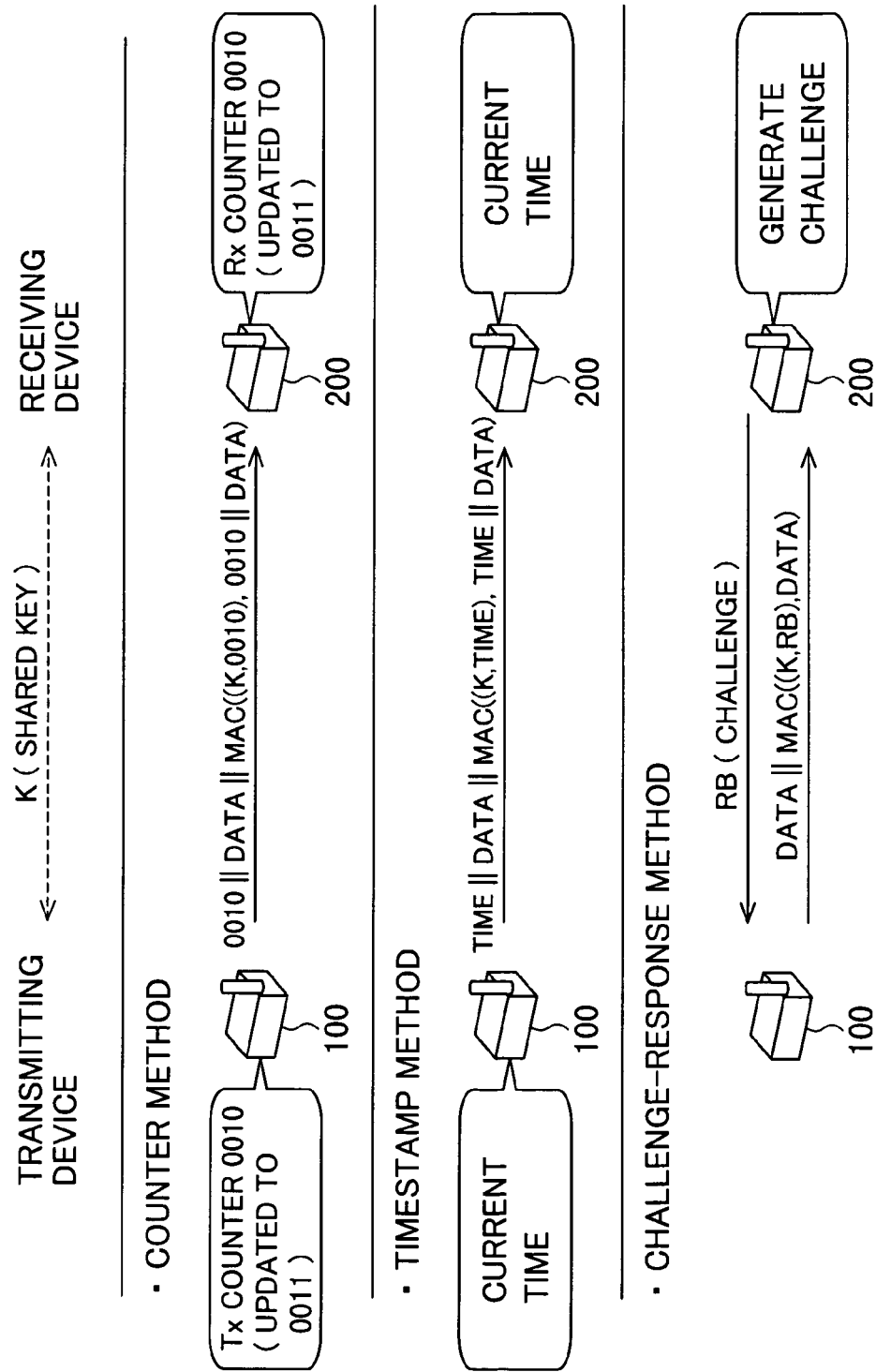
FIG. 1 illustrates three conventional methods for preventing replay attacks in data transmission between communicating devices.

Embodiments of the invention will now be described with reference to the attached drawings, in which like elements are indicated by like reference characters. Each embodiment is shown as a communication data freshness confirmation system including a transmitting device and a receiving device.

First Embodiment

Figure 2:
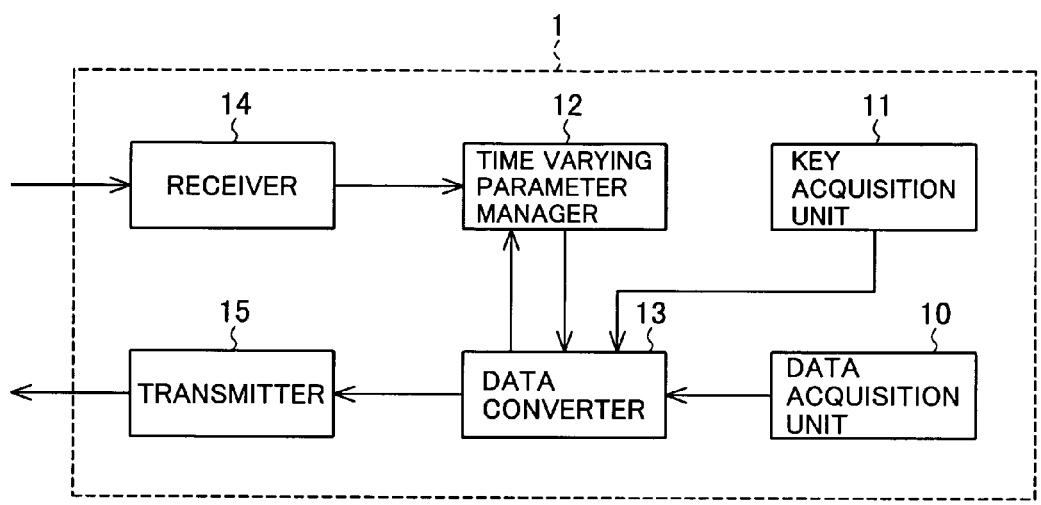
FIG. 2 is a block diagram illustrating the internal structure of the transmitting device in a first embodiment of the invention.

Referring to FIG. 2, the transmitting device 1 in the first embodiment includes at least a data acquisition unit 10, a key acquisition unit 11, a time varying parameter manager 12, a data converter 13, a receiver 14, and a transmitter 15.

The data acquisition unit 10 obtains data to be transmitted to the receiving device. The data, referred to below as communication data, may be generated by the data acquisition unit 10 itself or received from an external source (not shown). The data acquisition unit 10 sends the communication data to the data converter 13.

The key acquisition unit 11 obtains key information that is shared with the receiving device. The key information is held permanently or semi-permanently in a non-volatile storage medium, such as a read only memory (ROM), a flash ROM, or a hard disk drive, and remains stored regardless of whether the transmitting device 1 is in a sleep state or not. The key acquisition unit 11 provides the key information to the data converter 13.

The time varying parameter manager 12 manages a time varying parameter, such as a counter value or timestamp, that enables the receiving device to determine the freshness of converted data as described below. The time varying parameter may be lost when the transmitting device 1 enters a deep sleep state. The time varying parameter manager 12 initializes the time varying parameter when it receives challenge information from the receiving device through the receiver 14. The initial value of the time varying parameter may be a counter value of zero or time information obtained from a clock or timer that resumes operation on recovery from the deep sleep state. Other examples of time varying parameters that may be used include communication data sequence numbers, counter values associated with key information, timestamps indicating the time of recovery from the sleep state, and random numbers. The time varying parameter may be managed and updated in any way provided it is managed in the same way at the receiving device. For example, a counter value may be incremented or decremented each time the transmitting device 1 completes a data transmission to the receiving device, or a clock-based timestamp may be changed automatically with the passage of time. If the security level required for a particular communication data freshness confirmation system allows, it may even acceptable for the time varying parameter not to be updated each time communication is carried out, although this risks exposure to a replay attack. Upon receiving a time varying parameter request message from the data converter 13, the time varying parameter manager 12 responds by sending the requested time varying parameter together with the challenge information received from the receiver 14 to the data converter 13.

The data converter 13 converts communication data received from the data acquisition unit 10 into a form that enables the receiving device to determine the freshness of the communication data. To convert the communication data, the data converter 13 sends a time varying parameter request message to the time varying parameter manager 12, and receives the latest value of the time varying parameter value together with the challenge information generated by the receiving device. The data converter 13 converts the communication data received from the data acquisition unit 10 by using the challenge information, the time varying parameter, and key information received from the key acquisition unit 11. Any conversion method that includes these three elements may be used. In one exemplary method, a data string is first obtained by concatenating the time varying parameter and the communication data. This data string, the key information, the challenge information, and the time varying parameter are then used to generate a message authentication code, and the message authentication code is added to the data string to obtain the converted data. Alternatively, a digital signature may be generated in a similar manner and added to the data string to obtain the converted data, or the challenge may be incorporated into the data string, which is then encrypted with the key. The data converter 13 passes the converted data to the transmitter 15. The time varying parameter and the challenge information used in the conversion process may also be placed in the converted data explicitly.

The receiver 14 passes the challenge information received from the receiving device to the time varying parameter manager 12.

The transmitter 15 transmits the converted data received from the data converter 13 to the receiving device.

Figure 3:
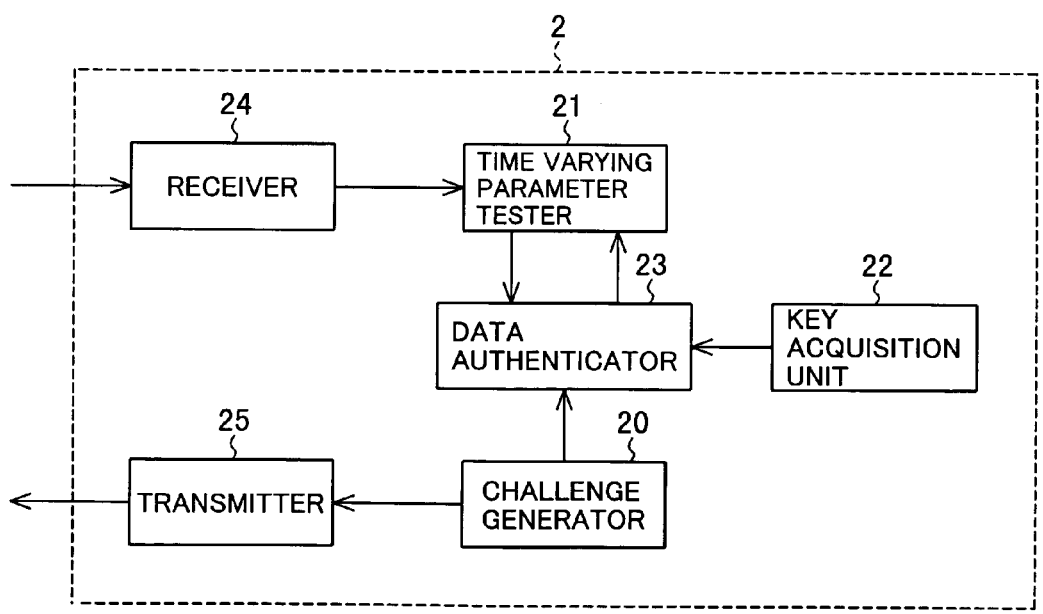
FIG. 3 is a block diagram illustrating the internal structure of the receiving device in the first embodiment.

Referring to FIG. 3, the receiving device 2 includes at least a challenge generator 20, a time varying parameter tester 21, a key acquisition unit 22, a data authenticator 23, a receiver 24, and a transmitter 25.

The challenge generator 20 generates challenge information for use in freshness confirmation. The challenge information should be unique information that does not duplicate challenge information generated previously, at least not for the same transmitting device and the same key. Random numbers may be used in generating the challenge information, for example. The random numbers may be generated by the challenge generator 20 itself or received from an external source (not shown). The challenge generator 20 provides the challenge information to the data authenticator 23 and the transmitter 25.

The time varying parameter tester 21 manages a time varying parameter, such as a counter value, timestamp, or the like, uses it to test the freshness of the communication data included in converted data received from the receiver 24, by comparing a value of the time varying parameter given in the communication data with its own value of the time varying parameter. For example, the time varying parameter tester 21 may decide that the communication data are fresh if a counter value given in the converted data is equal to or greater than a counter value managed by the time varying parameter tester 21 itself, or if the difference between a timestamp in the converted data and a timestamp obtained from a clock managed by the time varying parameter tester 21 itself is within a predetermined limit. The method used by the time varying parameter tester 21 to determine freshness must match the method used by the transmitting device 1 in generating the converted data.

The final freshness determination is made after successful authentication by the data authenticator 23. If the time varying parameter appears explicitly in the converted data, however, the time varying parameter tester 21 may make a provisional freshness decision before the authentication process begins, by comparing the time varying parameter value explicitly presented in the converted data with the time varying parameter managed by the time varying parameter tester 21 itself. The time varying parameter tester 21 discards the received converted data if they fail this provisional freshness test. If they pass this provisional freshness test, the time varying parameter tester 21 sends the converted data to the data authenticator 23 to be authenticated. If authentication succeeds, thereby confirming the freshness of the converted data, the time varying parameter tester 21 may update its own value of the time varying parameter. If authentication fails, the time varying parameter tester 21 may discard the converted data without updating its own value of the time varying parameter.

No time varying parameter can serve as a criterion for determining the freshness of the first converted data received after recovery from the deep sleep state, so the time varying parameter tester 21 simply sends the first converted data to the data authenticator 23, and treats the converted data as fresh if authentication succeeds.

The data freshness determination is made following successful authentication if the converted data received from the receiver 24 do not explicitly include the time varying parameter used for data conversion. This may occur because the converted data have been encrypted, for example, or because the time varying parameter was only used to convert the communication data and was not included in the converted data explicitly. In such cases, the time varying parameter tester 21 sends the converted data received from the receiver 24 to the data authenticator 23. The time varying parameter tester 21 may also give the data authenticator 23 an inferred value of the time varying parameter as an estimate of the value used for conversion of the converted data. The inferred value is confirmed as correct if an authentication success message is received. The time varying parameter tester 21 may also receive the successfully authenticated time varying parameter from the data authenticator 23 together with the authentication success message. The time varying parameter tester 21 compares the successfully authenticated time varying parameter with the time varying parameter managed by the time varying parameter tester 21 itself to determine the freshness of the converted data received from the receiver 24. If freshness is confirmed, the time varying parameter tester 21 recognizes the successfully authenticated time varying parameter as the latest value of the time varying parameter managed by the transmitting device 1, and updates the time varying parameter managed by the time varying parameter tester 21 itself as necessary. If freshness is not confirmed, the time varying parameter tester 21 determines that the converted data received from the receiver 24 is not fresh and discards the converted data. For the first converted data received after recovery from the deep sleep state, however, the time varying parameter tester 21 does not have a time varying parameter that can serve as a criterion to determine data freshness, so if authentication succeeds, the time varying parameter tester 21 may simply recognize the successfully authenticated time varying parameter as the latest value of the time varying parameter managed by the transmitting device 1.

The key acquisition unit 22 operates in the same way as the key acquisition unit 11 in the transmitting device 1, and sends the obtained key information to the data authenticator 23.

The data authenticator 23 authenticates the converted data received from the time varying parameter tester 21 to determine whether the converted data were generated by the transmitting device 1 or not. If the converted data explicitly include a time varying parameter or if an inferred time varying parameter is received from the time varying parameter tester 21 together with the converted data, the data authenticator 23 authenticates the converted data by using the key information received from the key acquisition unit 22, the challenge information received from the challenge generator 20, and the time varying parameter or its inferred value. If the converted data do not explicitly include the time varying parameter and no inferred time varying parameter is received from the time varying parameter manager 12, the data authenticator 23 authenticates the converted data by using the key information received from the key acquisition unit 22, the challenge information received from the challenge generator 20, and a time varying parameter obtained through decoding or some other operation performed on the converted data received from the time varying parameter tester 21. In either case, the data authenticator 23 sends the time varying parameter tester 21 an authentication success message if authentication succeeds, and an authentication failure message if authentication fails.

When authentication succeeds, the data authenticator 23 may send the successfully authenticated time varying parameter together with the authentication success message to the time varying parameter tester 21. When authentication fails, the data authenticator 23 may discard the converted data itself, instead of leaving the time varying parameter tester 21 to discard the converted data as described above.

The receiver 24 sends the converted data received from the transmitting device 1 to the time varying parameter tester 21.

The transmitter 25 transmits the challenge information received from the challenge generator 20 to the transmitting device 1.

Figure 4:
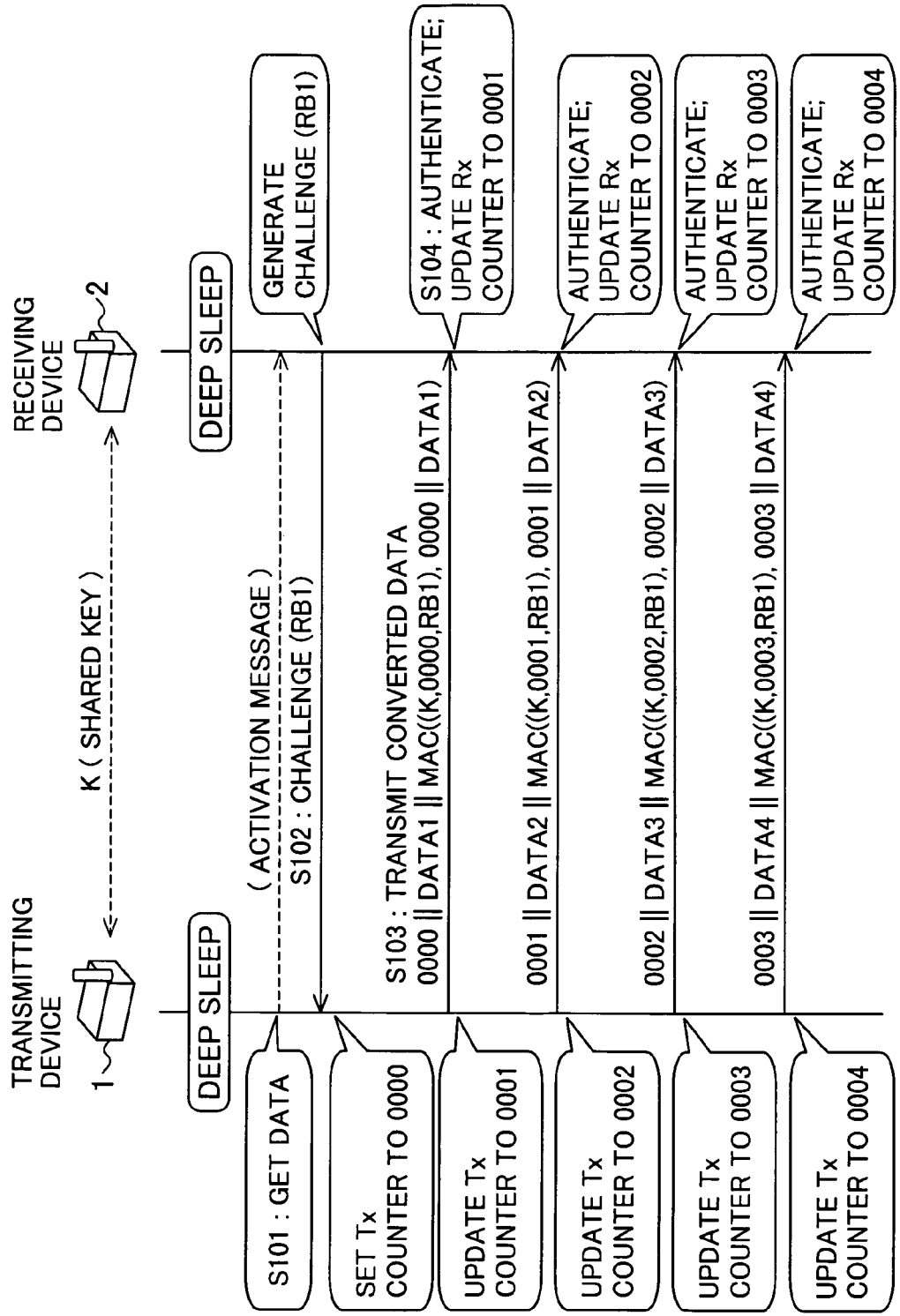
FIG. 4 is a communication sequence diagram illustrating the operation of the first embodiment.

The communication data freshness confirmation system in the first embodiment can operate in various ways. FIG. 4 shows one example.

(1) A counter value is used as the time varying parameter. The converted data are considered fresh if the counter value used for data conversion is equal to or greater than the counter value managed by the receiving device 2.

(2) The converted communication data are a concatenation of the time varying parameter (counter value), the communication data, and a message authentication code. The message authentication code is generated by using a key K shared by the transmitting device 1 and the receiving device 2, the challenge information generated by the receiving device 2, and the time varying parameter to operate on a data string obtained by concatenating the time varying parameter with the communication data.

(3) The challenge information is not placed in the converted data explicitly (e.g., as plain text). The receiving device 2 assumes that the challenge information generated and transmitted by the receiving device 2 has been used to convert the communication data, and verifies this assumption through the authentication operation performed by the data authenticator 23.

(4) The time varying parameter used for the data conversion is included in the converted data explicitly (e.g., as plain text). The time varying parameter tester 21 uses the explicitly included time varying parameter to make a provisional freshness determination before the converted data are authenticated.

The operation of the communication data freshness confirmation system in the first embodiment includes at least four main steps S101-S104.

In step S101, the data acquisition unit 10 in the transmitting device 1 obtains communication data. In this step, the transmitting device 1 may also transmit an activation request message to inform the receiving device 2 that it has communication data to send.

In step S102, the challenge generator 20 in the receiving device 2 generates challenge information RB1 and the transmitter 25 transmits the challenge information to the transmitting device 1.

In step S103, the transmitting device 1 converts the communication data and sends the converted communication data to the receiving device 2.

In step S104, the receiving device 2 authenticates the converted communication data and confirms the freshness thereof.

The operations performed in steps S103 and S104 as a series of communication data items are transmitted from the transmitting device 1 to the receiving device 2 will now be described in more detail, with reference to FIG. 4.

To transmit the first item of communication data, in step S103, the time varying parameter manager 12 in the transmitting device 1 receives the challenge information RB1 from the receiving device 2 through the receiver 14 and initializes a counter value that will be used as a time varying parameter associated with the challenge information RB1. This counter will also be referred to as a transmission counter. Its initial value is 0000. The data converter 13 requests the time varying parameter from the time varying parameter manager 12 and receives both the initial transmission counter value 0000 and the challenge information RB1. The data converter 13 also receives the shared key K from the key acquisition unit 11 and the first item of data (data-1) from the data acquisition unit 10. The data converter 13 concatenates the transmission counter value 0000 with the first item of data and operates on the resulting concatenated data string by using the shared key K, the transmission counter value 0000, and the challenge information RB1 to generate a message authentication code. The data converter 13 then appends the message authentication code to the data string to obtain the converted data, and transmits the converted data to the receiving device 2 through the transmitter 15. The time varying parameter manager 12 updates the transmission counter by incrementing its value from 0000 to 0001.

In step 104, the time varying parameter tester 21 in the receiving device 2 receives the converted data through the receiver 24. Because the receiving device 2 has just emerged from the deep sleep state, the time varying parameter tester 21 has no time varying parameter that can serve as a criterion to determine the freshness of the received converted data, so the time varying parameter tester 21 simply sends the converted data to the data authenticator 23 to be authenticated.

The data authenticator 23 uses the shared key K received from the key acquisition unit 22, the challenge information RB1 received from the challenge generator 20, and the transmission counter value 0000 explicitly included in the converted data to perform the same operation as performed by the transmitting device 1 on the transmission counter value 0000 and the communication data (data-1) in the converted data. If the result of this operation matches the message authentication code included in the converted data, the data authenticator 23 sends an authentication success message to the time varying parameter tester 21. Upon receiving this authentication success message, the time varying parameter tester 21 concludes that the converted data are fresh and that the transmission counter value 0000 in the converted data was genuinely the counter value the transmitting device 1 used to convert the data. The time varying parameter tester 21 therefore sets its own counter, referred to below as the reception counter, to the value 0001, which is obtained by incrementing the transmission counter value 0000 by one.

If the result of the operation performed by the data authenticator 23 does not match the message authentication code included in the converted data, the data authenticator 23 sends an authentication failure message to the time varying parameter tester 21. The time varying parameter tester 21 concludes that the converted data received by the receiver 24 were not fresh, and discards the converted data.

The transmission and reception of the second item of communication data (data-2) will now be described.

In step S103, the data converter 13 in the transmitting device 1 requests the time varying parameter from the time varying parameter manager 12, and receives the challenge data RB1 and the transmission counter value 0001. The data converter 13 generates a message authentication code for a data string obtained by concatenating the transmission counter value 0001 and the second item of communication data as described above and generates the converted data by appending the message authentication code to this data string. The transmitter 15 transmits the converted data to the receiving device 2. The time varying parameter manager 12 updates its transmission counter for the challenge information RB1 by incrementing the value from 0001 to 0002.

In step S104, the time varying parameter tester 21 in the receiving device 2 receives the converted data through the receiver 24. If the transmission counter value included explicitly in the received converted data is equal to or greater than the reception counter value 0001, the time varying parameter tester 21 provisionally regards the converted data as fresh and passes the converted data to the data authenticator 23. If the transmission counter value in the converted data is less than the reception counter value 0001, the time varying parameter tester 21 decides that the received converted data are not fresh and discards the converted data.

If the time varying parameter tester 21 decides that the converted data are provisionally fresh, the data authenticator 23 tests the message authentication code included in the converted data as described above, using the shared key K, the challenge information RB1, and the transmission counter value 0001 explicitly included in the converted data. If the message authentication code matches the result obtained by the data authenticator 23, the time varying parameter tester 21 receives an authentication success message, confirms its provisional decision that the converted data are fresh, recognizes the transmission counter value 0001 included in the converted data as the latest counter value managed by the transmitting device 1 when the converted data were generated, and sets its reception counter to 0002, which is obtained by incrementing the transmission counter value 0001 by one.

If authentication fails, the data authenticator 23 sends an authentication failure message to the time varying parameter tester 21, and the time varying parameter tester 21 discards the converted data.

The third and subsequent items of communication data are transmitted and received in the same way as the second item, as shown in FIG. 4.

Figure 5:
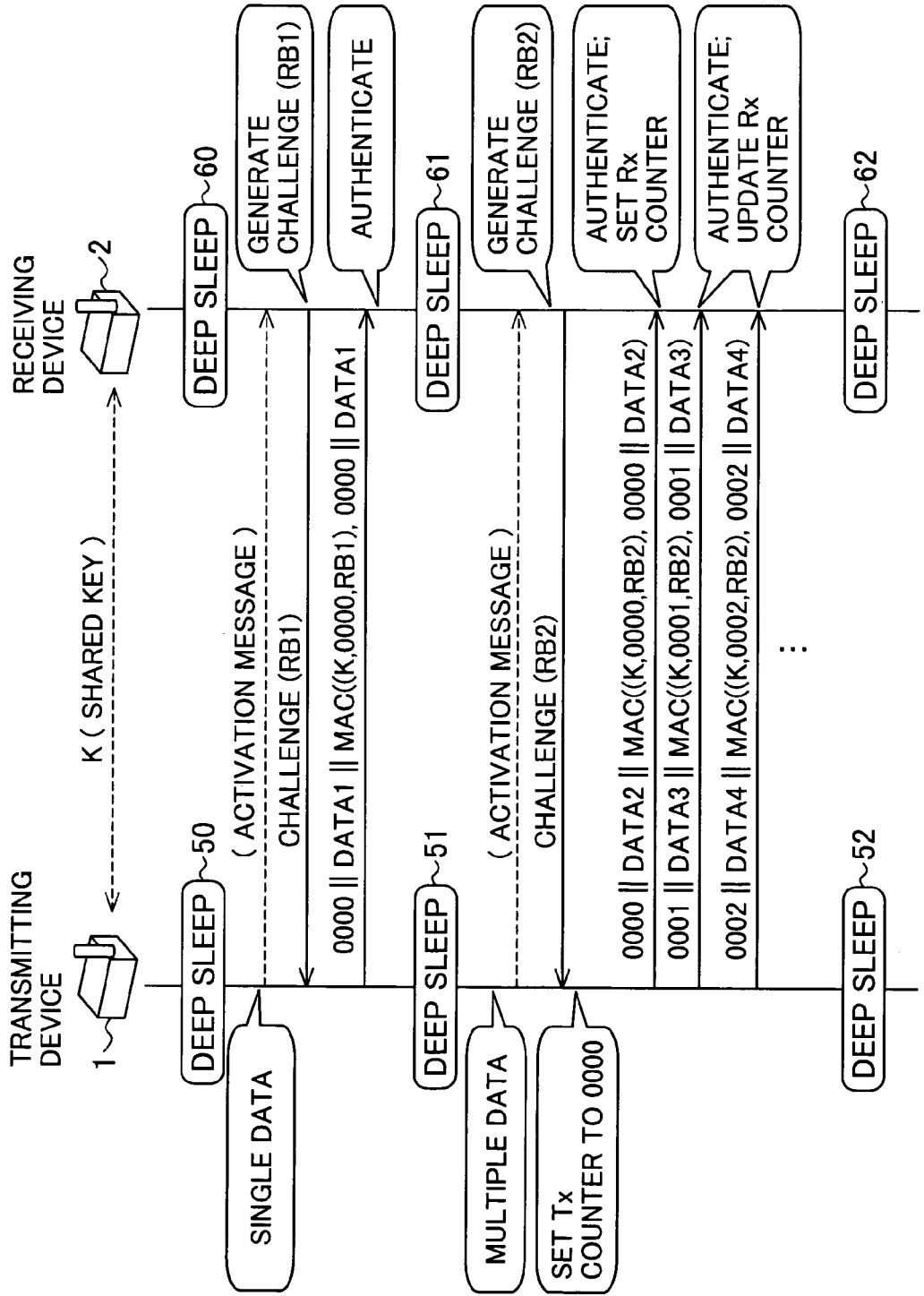
FIG. 5 is a diagram illustrating the operation of the first embodiment after the communicating devices emerge from a deep sleep.

The communication data freshness confirmation operations performed when the transmitting device 1 emerges from the deep sleep state to transmit just one item of communication data, re-enters the deep sleep state, then re-emerges to transmit a series of items of communication data will now be described with reference to FIG. 5.

Initially, the transmitting device 1 is in a deep sleep state 50 and the receiving device 2 is also in a deep sleep state 60. After the transmitting device 1 and the receiving device 2 emerge from their deep sleep states, the receiving device 2 transmits challenge information RB1 to the transmitting device 1, the transmitting device 1 transmits converted data obtained from a first item of communication data (data-1) to the receiving device 2, and the receiving device 2 authenticates and confirms the freshness of the transmitted data. The steps performed in this operation are the same as steps S101 to S104 when the first item of communication data (data-1) is transmitted in FIG. 4.

The transmitting device 1 and receiving device 2 now reenter respective deep sleep states 51 and 61, and then re-emerge to resume communication. After the transmitting device 1 and receiving device 2 have emerged from deep sleep states 51 and 61, the transmitting device 1 sends an activation message to the receiving device 2, and the receiving device 2 transmits challenge information RB2 to the transmitting device 1. Challenge information RB2 are generated so as not to duplicate the challenge information RB1 transmitted following the previous deep sleep states 50 and 60. The communication operations performed at this point are similar to steps S101 and S102 in FIG. 4.

The transmitting device 1 then transmits converted data obtained from the second item of communication data (data-2) to the receiving device 2. The operations performed in steps S103 and S104 at this point are identical to the operations performed in transmitting and receiving the first data item (data-1), except that challenge information RB2 is used instead of challenge information RB1.

The transmitting device 1 then transmits converted data obtained from the subsequent items of communication data (data-3, data-4, . . . ) to the receiving device 2 in the same way, continuing to use challenge information RB2 but updating the transmission counter in the same way as at the bottom of FIG. 4. The receiving device receives, authenticates, and confirms the freshness of the transmitted communication data, and updates the reception counter.

Compared with conventional freshness confirmation methods that consume power and generate additional traffic by transmitting new challenge information for each new item of data, the first embodiment conserves power and reduces traffic congestion by transmitting challenge information only once per active interval between deep sleep states. Furthermore, even though the freshness of the first data transmitted after recovery from the deep sleep state is confirmed by the challenge information and the freshness of subsequent data is confirmed by a time varying parameter, the same data format and data conversion method is used for both the first data and the subsequent data.

To summarize, to begin receiving communication data after the transmitting device 1 or receiving device 2 emerges from the deep sleep state, the receiving device 2 generates new challenge information and transmits it to the transmitting device 1. The transmitting device 1 uses the challenge information and a time varying parameter to convert the first communication data, so that the new challenge information demonstrates the freshness of the converted data. For the second and subsequent communication data, the transmitting device 1 continues to use the same challenge information in generating the converted data but the value of the time varying parameter changes, thereby continuing to demonstrate the freshness of the converted data. The time varying parameter does not have to be stored in the deep sleep state; the transmitting device 1 can initialize the time varying parameter when it emerges from the deep sleep state, and the receiving device 2 can set its own time varying parameter when it successfully receives the first communication data from the transmitting device 1.

The same procedure can be used to confirm data freshness after the transmitting device 1 or receiving device 2 recovers from a malfunction in which the value of the time varying parameter is lost, or after the transmitting device 1 or receiving device 2 is reset.

Since the receiving device 2 has to generate and transmit a challenge only to receive the first data, the first embodiment confirms data freshness without consuming as much power or generating as much traffic as conventional challenge systems that require a new challenge before every data transmission.

Although the first embodiment is flexible in confirming the freshness of the first data and additional data in different ways, it uses the same data conversion method and format for both the first data and the additional data, so the flexibility is achieved without added complexity and all data can be transmitted and received by the same procedures.

In a variation of the first embodiment, the challenge information is placed explicitly in the converted data. The time varying parameter tester 21 in the receiving device 2 can then provisionally determine the freshness of the first data by comparing the challenge information explicitly received in the first data with the transmitted challenge information.

Second Embodiment

The following description deals mainly with the differences from the first embodiment.

Figure 6:
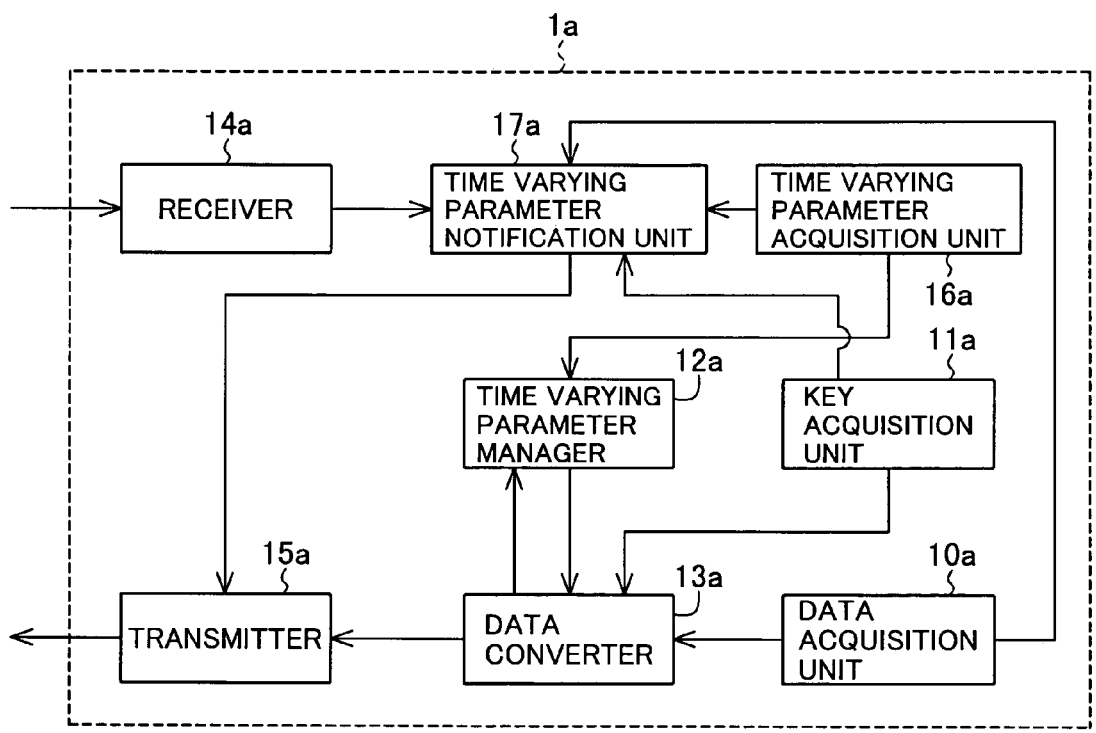
FIG. 6 is a block diagram illustrating the internal structure of the transmitting device in a second embodiment.

As shown in FIG. 6, the transmitting device 1a in the second embodiment includes at least a data acquisition unit 10a, a key acquisition unit 11a, a time varying parameter manager 12a, a data converter 13a, a receiver 14a, a transmitter 15a, a time varying parameter acquisition unit 16a, and a time varying parameter notification unit 17a.

The time varying parameter acquisition unit 16a obtains a starting value of a time varying parameter managed in association with the receiving device and the shared key. The time varying parameter acquisition unit 16a includes, for example, a real time clock that continues to operate while the transmitting device 1a is in the deep sleep state, and uses a time value obtained from the real time clock as the starting value of the time varying parameter. The time varying parameter acquisition unit 16a may also use a reference table, a function, or the like stored in a non-volatile storage medium to derive values of the time varying parameter from the time value obtained from the clock. For example, if data communication cannot be initiated at intervals shorter than one-tenth of a second, if usage of the key information starts at a time T0 (measured in seconds and fractions thereof), and if this time value (T0) is stored in a non-volatile storage medium, then upon recovery from the deep sleep state, the starting value of the time varying parameter can be obtained by acquiring the current time T (similarly measured) from the real time clock, subtracting T0 from T, multiplying the result by ten, and rounding down to the nearest integer. The time varying parameter acquisition unit 16a supplies this starting value to the time varying parameter notification unit 17a and the time varying parameter manager 12a.

From the starting value of the time varying parameter received from the time varying parameter acquisition unit 16a, the time varying parameter notification unit 17a generates a time varying parameter notification message for transmission to the receiving device 2a. At a minimum, the time varying parameter notification unit 17a generates the time varying parameter notification message from the value of the time varying parameter received from the time varying parameter acquisition unit 16a by using challenge information received from the receiver 14a and key information received from the key acquisition unit 11a, and transmits the time varying parameter notification message to the transmitter 15a. The time varying parameter notification unit 17a may also receive communication data from the data acquisition unit 10a and include the communication data in the time varying notification message. Any method of generating a time varying parameter notification message may be used as long as the resultant message has a form that enables the receiving device 2a to perform authentication and confirm the freshness of the message. For example, the time varying parameter notification unit 17a may operate like the data converter 13 in the first embodiment and add a message authentication code. Alternatively, the time varying parameter notification unit 17a may perform an encryption operation.

The data acquisition unit 10a operates as described in the first embodiment, except that it may also send communication data to the time varying parameter notification unit 17a. For example, when there is only one item of communication data to be transmitted, the data acquisition unit 10a may send the communication data to the time varying parameter notification unit 17a so that the time varying parameter notification unit 17a can place the communication data in the time varying parameter notification message.

The key acquisition unit 11a operates as described in the first embodiment, except that it also supplies the key information to the time varying parameter notification unit 17a.

The time varying parameter manager 12a operates as described in the first embodiment, except that it does not receive challenge information from the receiver 14a or send challenge information to the data converter 13a, does not update the time varying parameter after transmission of the first converted data, and initializes the time varying parameter to the starting time received from the time varying parameter acquisition unit 16a.

The data converter 13a operates basically as described in the first embodiment, except that it does not receive challenge information from the time varying parameter manager 12a, and uses only the key information received from the key acquisition unit 11a and the time varying parameter received from the time varying parameter manager 12a to convert the communication data.

The receiver 14a passes the challenge information received from the receiving device 2a to the time varying parameter notification unit 17a.

The transmitter 15a transmits the time varying parameter notification message received from the time varying parameter notification unit 17a or the converted data received from the data converter 13a to the receiving device 2a.

Figure 7:
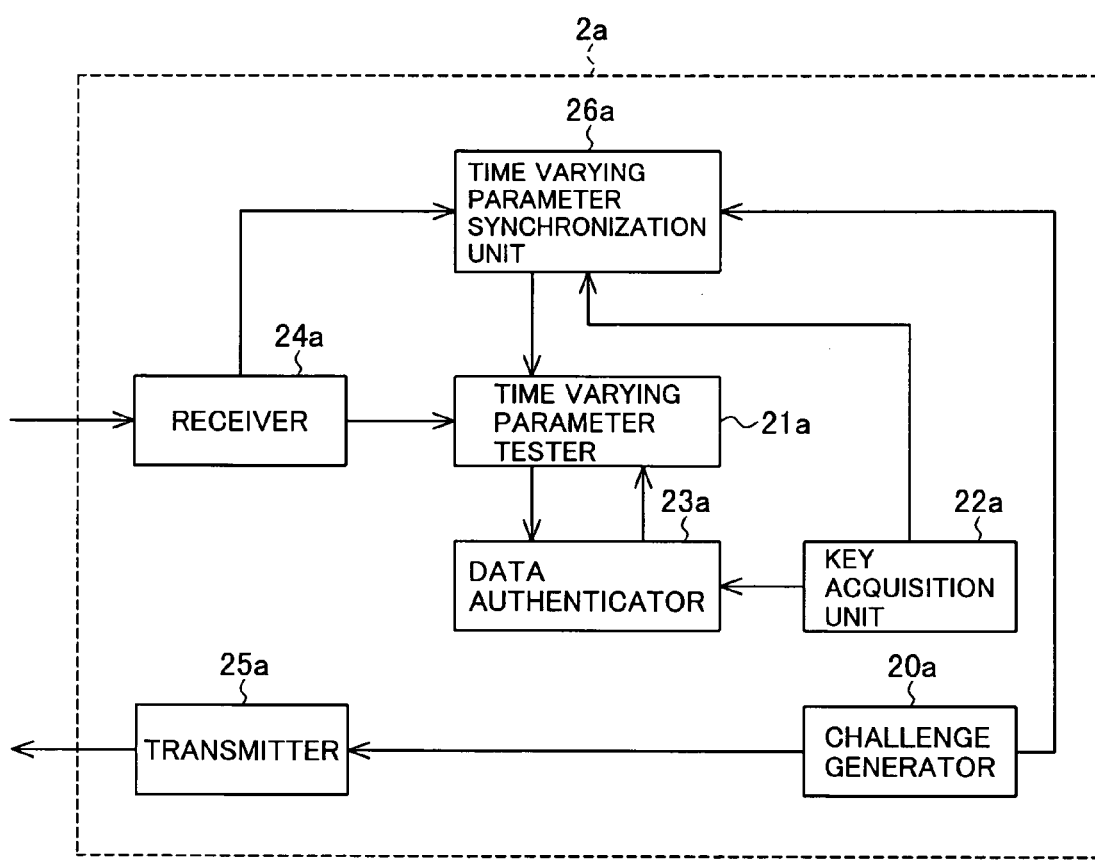
FIG. 7 is a block diagram illustrating the internal structure of the receiving device in the second embodiment.

Referring to FIG. 7, in the second embodiment the receiving device 2a includes at least a challenge generator 20a, a time varying parameter tester 21a, a key acquisition unit 22a, a data authenticator 23a, a receiver 24a, a transmitter 25a, and a time varying parameter synchronization unit 26a.

The challenge generator 20a operates as described in the first embodiment, except that it supplies the challenge information to the time varying parameter synchronization unit 26a as well as the transmitter 25a.

The time varying parameter synchronization unit 26a obtains the starting value of the time varying parameter from the transmitting device 1a and performs a synchronization operation. The time varying parameter synchronization unit 26a authenticates the time varying parameter notification message received from the receiver 24a and confirms its freshness by using the key information received from the key acquisition unit 22a and the challenge information received from the challenge generator 20a. As described above, the time varying parameter notification message may include communication data, and the time varying parameter synchronization unit 26a can authenticate and confirm the freshness of the communication data as well as the starting value of the time varying parameter. The time varying parameter synchronization unit 26a then sends the starting value to the time varying parameter tester 21a.

The time varying parameter tester 21a operates as described 21 in the first embodiment, except that it initializes its time varying parameter to the starting value received from the time varying parameter synchronization unit 26a. The receiving device 2 therefore does not require a clock that continues to operate in the deep sleep state.

This is true even if the time varying parameter is a timestamp instead of a counter value. The time varying parameter tester 21a can then use, for example, a clock that is reset in the deep sleep state and starts running anew when the receiving device 2 wakes up, and can test the freshness of received data by checking for a consistent lag between the clock time and the timestamps in received data. Clock synchronization is less difficult than in conventional systems because synchronization only has to be maintained for the typically short interval between sleep periods.

The key acquisition unit 22a operates as described in the first embodiment, except that it also supplies the key information to the time varying parameter synchronization unit 26a.

The data authenticator 23a operates as described in the first embodiment, except that it does not receive the challenge information from the challenge generator 20a and does not use challenge information for authentication.

The receiver 24a sends the time varying parameter notification message received from the transmitting device 1a to the time varying parameter synchronization unit 26a, and sends converted data received from the transmitting device 1a to the time varying parameter tester 21a.

The transmitter 25a operates as described in the first embodiment.

Figure 8:
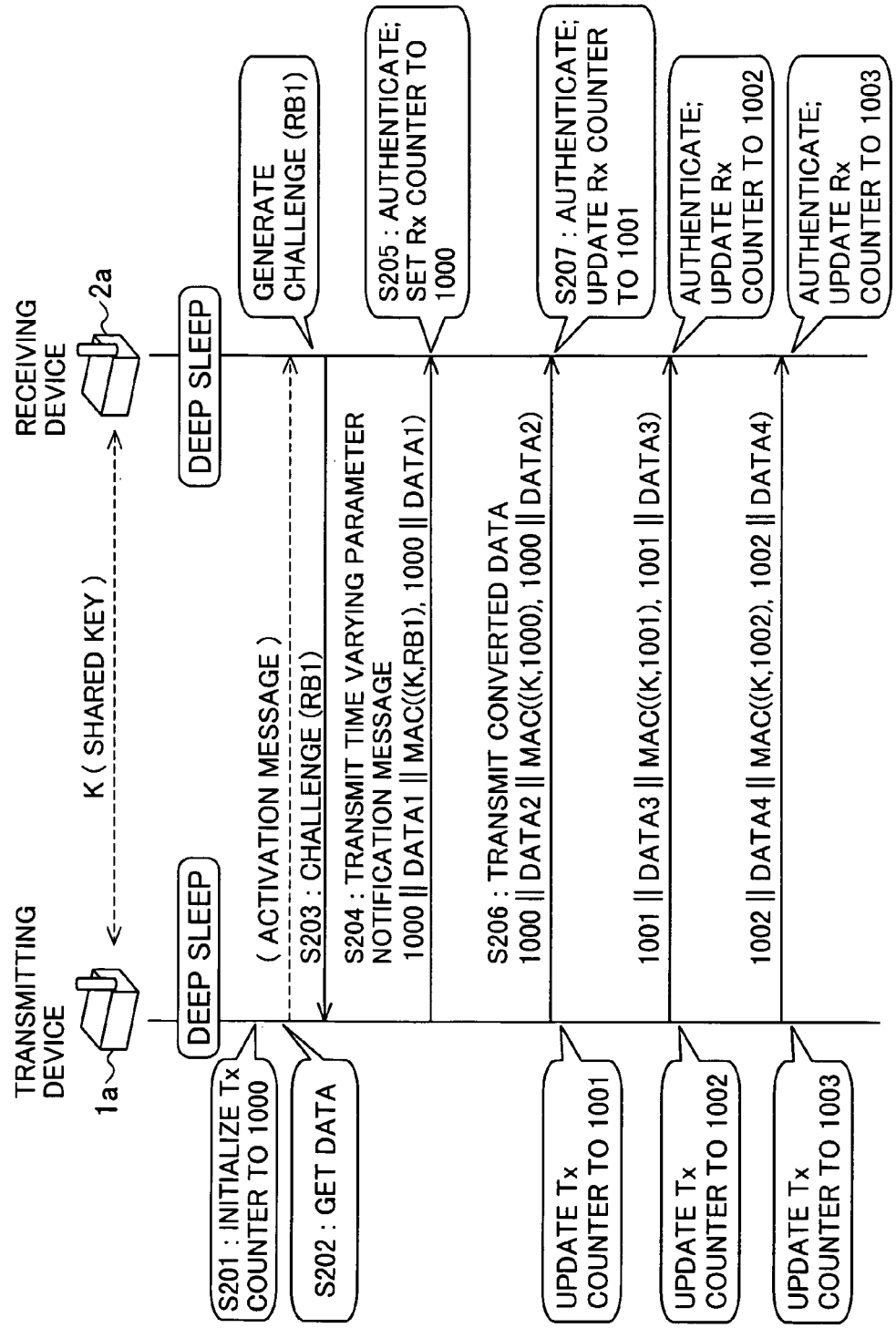
FIG. 8 is a communication sequence diagram illustrating the operation of the second embodiment.

The communication data freshness confirmation system in the second embodiment can operate in various ways. FIG. 8 shows one example.

(1) A counter value is used as the time varying parameter. The converted data are considered fresh if the counter value used for data conversion is equal to or greater than the counter value managed by the receiving device 2a.

(2) The converted communication data are a concatenation of the time varying parameter (counter value), the communication data, and a message authentication code. The message authentication code is generated by using a key K shared by the transmitting device 1a and the receiving device 2a and the time varying parameter to operate on a data string obtained by concatenating the time varying parameter with the communication data.

(3) The time varying parameter notification message is a concatenation of the time varying parameter, the communication data, and a message authentication code. The message authentication code is generated by using the shared key K, the challenge information generated by the receiving device 2a, and the time varying parameter to operate on a data string obtained by concatenating the time varying parameter with the communication data.

(4) Accordingly, communication data are placed in the time varying parameter notification message explicitly (e.g., as plain text), but the challenge information is not placed in the time varying parameter notification message explicitly. The receiving device 2a assumes that the challenge information generated and transmitted by the receiving device 2a has been used to time varying parameter notification message, and verifies this assumption by the authentication and freshness confirmation operation performed by the time varying parameter synchronization unit 26a.

(5) The time varying parameter used for the data conversion is included in the converted data explicitly (e.g., plain text). The time varying parameter tester 21a in the receiving device 2a uses the explicitly included time varying parameter to make a provisional freshness determination before the converted data are authenticated.

The operation of the communication data freshness confirmation system in the second embodiment includes at least four main steps S201-S207.

In step S201, the time varying parameter acquisition unit 16a in the transmitting device 1a applies a mathematical function to a time value T obtained from the real time clock and the time T0 at which use of the shared key K began to obtain the starting value of the transmission counter. The value of T0 is stored in a non-volatile storage medium, and the real time clock continues to run while the transmitting device 1a is in the deep sleep state, so the transmission counter value does not repeat itself over the duration for which the key K is used. The exemplary transmission counter value 1000 is shown in FIG. 8. The time varying parameter acquisition unit 16a supplies this transmission counter value 1000 to the time varying parameter manager 12a and the time varying parameter notification unit 17a. The time varying parameter manager 12a initializes the value of the counter it manages in association with the shared key K to the same value 1000.

In step S202, the data acquisition unit 10a in the transmitting device 1a obtains plural items of communication data, sends the first item (data-1) to the time varying parameter notification unit 17a, and sends the second item (data-2) and subsequent items to the data converter 13a. The transmitting device 1a may also transmit an activation request message to the receiving device 2a, as shown.

In step S203, the challenge generator 20a in the receiving device 2a generates challenge information RB1 and transmits it to the transmitting device 1a through the transmitter 25a.

In step S204, the time varying parameter notification unit 17a in the transmitting device 1a uses the shared key K received from the key acquisition unit 11a and the challenge information received from the receiver 14a to generate a message authentication code for a data string obtained by concatenating the transmission counter value 1000 received from the time varying parameter acquisition unit 16a and the first item of communication data received from the data acquisition unit 10a, and generates a time varying parameter notification message by adding the message authentication code to the above data string. The transmitter 15a transmits the time varying parameter notification message to the receiving device 2a.

In step S205, the receiver 24a in the receiving device 2a receives the time varying parameter notification message. The time varying parameter synchronization unit 26a uses the shared key K received from the key acquisition unit 22a and the challenge information RB1 received from the challenge generator 20a to authenticate the received time varying parameter notification message and confirm its freshness, obtains the transmission counter value 1000 and data-1 from the message, and passes the transmission counter value 1000 to the time varying parameter tester 21a. The time varying parameter tester 21a sets the reception counter it maintains for key K to the received value 1000.

In step S206, the data converter 13a in the transmitting device 1a requests the time varying parameter from the time varying parameter manager 12a and receives the starting counter value 1000. The data converter 13a uses the shared key K received from the key acquisition unit 11a and the transmission counter value 1000 to generate a message authentication code for a data string obtained by concatenating the transmission counter value 1000 and data-2, and generates converted data by appending the message authentication code to this data string. The transmitter 15a transmits the converted data to the receiving device 2a. The time varying parameter manager 12a then increments its transmission counter from 1000 to 1001.

In step S207, the receiver 24a in the receiving device 2a receives the converted data. If the transmission counter value (1000) included explicitly in the converted data is equal to or greater than the reception counter value (1000) managed by the time varying parameter tester 21a itself, the time varying parameter tester 21a provisionally regards the received converted data as fresh and passes the converted data to the data authenticator 23a. If the transmission counter value in the converted data is less than the reception counter value (1000), the time varying parameter tester 21a decides that the received converted data are not fresh and discards the converted data.

If the time varying parameter tester 21a decides that the converted data are provisionally fresh, the data authenticator 23a tests the message authentication code included in the converted data by using the shared key K and the transmission counter value (1000) explicitly included in the converted data to operate on the concatenated data string including the transmission counter value (1000) and the data (data-2). If the message authentication code matches the result obtained by the data authenticator 23a, the time varying parameter tester 21a receives an authentication success message, confirms its decision that the converted data are fresh, recognizes the transmission counter value (0001) in the converted data as truly the value used by the transmitting device 1a to generate the converted data, and increments its reception counter (from 1000 to 1001).

If authentication fails, the data authenticator 23a sends the time varying parameter tester 21a an authentication failure message, and the time varying parameter tester 21a discards the converted data.

Data-3 and the subsequent items of communication data are transmitted and received in the same way as data-2.

As described above, in the present embodiment, the transmitting device 1a has a real time clock that continues to operate in the deep sleep state. The receiving device 2a may or may not have such a clock but in any case it is not used. Both the transmitting device 1a and the receiving device 2a set their time varying parameters (the transmission counter and the reception counter) by the transmitting device's real time clock when communication begins following recovery from the deep sleep state. The transmitting device 1a sends its latest real time clock value to the receiving device 2a in a message sent in response to a challenge from the receiving device 2a. The challenge enables the receiving device 2a to confirm the freshness of this message. The message may also include the first item of communication data. Thereafter, the transmission and reception counters are used to verify the freshness of further data until the transmitting and receiving devices reenter the deep sleep state.

As in the first embodiment, the time varying parameter does not have to be held in a non-volatile storage medium during deep sleep periods. If the value of the time varying parameter is lost due to a switchover to the deep sleep state or for any other reason, the time varying parameter can be reset by the real time clock, and the value to which the time varying parameter is reset will not duplicate a value used previously, because the real time clock runs continuously. Replay attacks can therefore be prevented by using the time varying parameter to confirm the freshness of communication data.

Instead of a real time clock, it is possible to use any source of starting values that vary from time to time, so that the same starting value is not used more than once with the same key.

An advantage of the second embodiment over conventional clock-based freshness confirmation methods is that there is no need to synchronize real time clocks running at both the transmitting device 1a and the receiving device 2a or to compensate for the differing speeds at which the clocks may run. A similar advantage is obtained in the first embodiment if a timestamp is used as the time varying parameter.

If a counter value is used as the time varying parameter in the second embodiment, it may be necessary to store a base value such as the time T0 in a non-volatile storage medium but this value is updated only when, for example, the key is changed, and need not be updated on every entry to the deep sleep state.

When there is only one item of data to be transmitted, it can be transmitted in the time varying parameter notification message and its freshness verified by the challenge and response method. Therefore, like the first embodiment, the second embodiment is flexible in its ability to adapt the freshness confirmation method to the amount of data being transmitted.

Third Embodiment

The following description deals mainly with the differences from the first embodiment.

Figure 9:
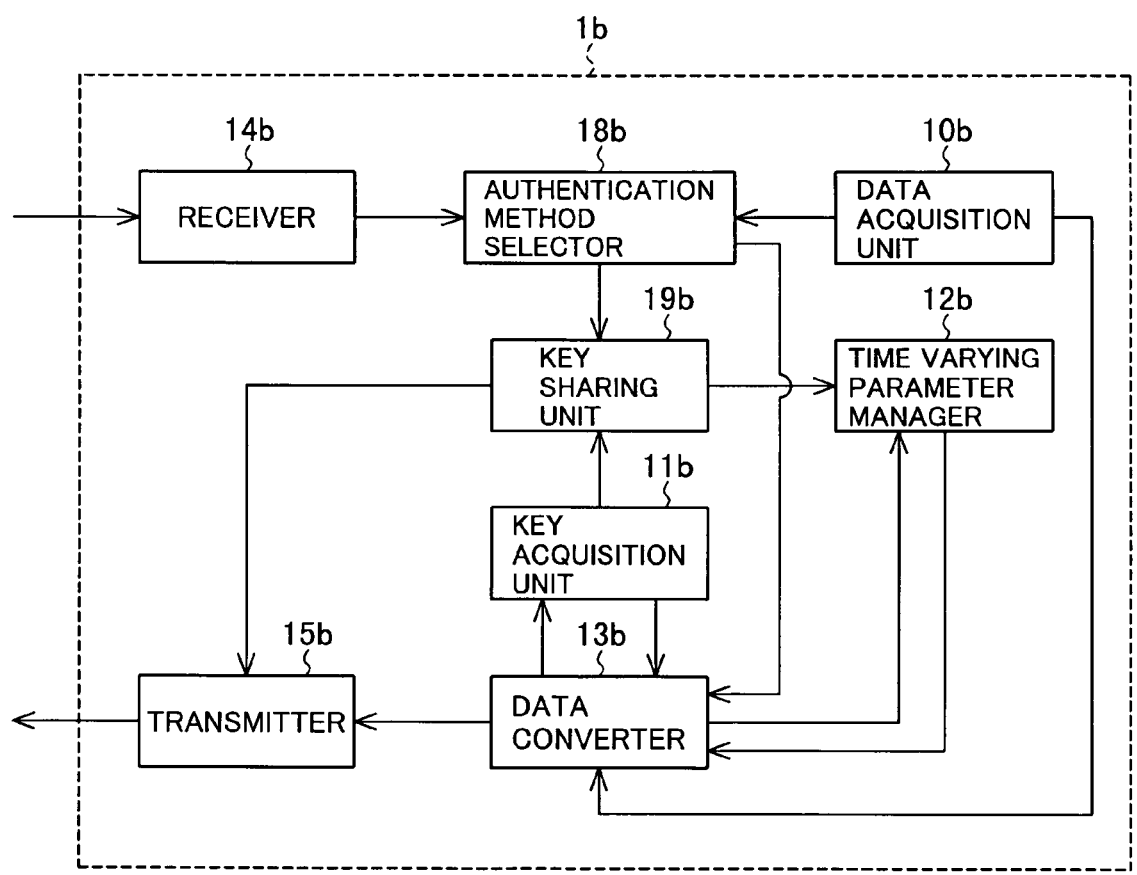
FIG. 9 is a block diagram illustrating the internal structure of the transmitting device in a third embodiment.

As shown in FIG. 9, the transmitting device 1b in the third embodiment includes at least a data acquisition unit 10b, a key acquisition unit 11b, a time varying parameter manager 12b, a data converter 13b, a receiver 14b, a transmitter 15b, an authentication method selector 18b, and a key sharing unit 19b.

The data acquisition unit 10b operates as described in the first embodiment, and also supplies the communication data it obtains to the authentication method selector 18b.

The authentication method selector 18b selects an authentication and data freshness confirmation method appropriate for the number of items of communication data to be transmitted to the receiving device 2b in the interval from one deep sleep period until the next. The available methods may include the conventional challenge-response method, the new methods described in the first and second embodiments, and another new method, described below, in which the key is changed. An item of communication data is, for example, an amount of data that can be sent in one packet. The authentication method selector 18b may determine the number of items from the amount communication data received from the data acquisition unit 10b upon recovery from the deep sleep mode, or from other information supplied by the data acquisition unit 10b. For example, the data acquisition unit 10b may initially give the authentication method selector 18b only one item of data to be sent to the receiving device 2b, but explicitly indicate that further items will be follow. The authentication method selector 18b may also select the authentication method according to the operational state of the transmitting device 1b.

In the following description, the authentication method selector 18b selects the challenge-response method when there is only one item of communication data to be transmitted, and the time varying parameter method, using a new key, when there are two or more items of communication data to be transmitted. When there is only one item of communication data to be transmitted, the authentication method selector 18b sends challenge information received from the receiver 14b to the data converter 13b. When there are two or more items of communication data to be transmitted, the authentication method selector 18b sends the challenge information received from the receiver 14b to the key sharing unit 19b.

Upon receiving the challenge information from the authentication method selector 18b, the key sharing unit 19b generates new key information from the challenge information, existing key information, and random number information. The existing key information is the key information received from the key acquisition unit 11b, which is already shared with the receiving device 2b. The key sharing unit 19b generates the random number information itself. Any method may be used in order to generate the new key information. In one exemplary method, a data string is obtained by concatenating the challenge information received from the receiving device 2b and the random number information generated by 19b itself. This data string is operated on by a keyed hash function that is keyed by the key information received from the key acquisition unit 11b. The output of the keyed hash function is used as the new key. In a variation of this method, the data string also includes unique identifiers of the transmitting device 1b and receiving device 2b. The key sharing unit 19b then generates a key sharing message including the random number, the transmitter 15b transmits the key sharing message to the receiving device 2b, and the receiving device 2b generates the new key from the random number, the challenge information, and the existing key, using the same keyed hash function as used by the key sharing unit 19b. In another exemplary method, the new key is simply the random number generated by the key sharing unit 19b itself; the new key is encrypted by use of the challenge information received from the receiving device 2b and the key information received from the key acquisition unit 11b, and transmitted to the receiving device 2b in a key sharing message which the receiving device 2b decrypts to obtain the new key.

The key acquisition unit 11b operates as described in the first embodiment, except that it normally supplies the key information to the key sharing unit 19b, and sends the key information to the data converter 13b only upon receiving a key request message from the data converter 13b.

Upon receiving new key information from the key sharing unit 19b, the time varying parameter manager 12b assigns a time varying parameter for the key information, initializes the time varying parameter, and manages the time varying parameter as described in the first embodiment. If a counter value is used as the time varying parameter, the counter may be initialized to zero, and if a time value is used as the time varying parameter, the time value may be set to the time at which the transmitting device 1b was activated. Upon receiving a time varying parameter request message from the data converter 13b, the time varying parameter manager 12b responds by providing the new key information and the time varying parameter.

The data converter 13b converts communication data received from the data acquisition unit 10b into a form that enables the receiving device 2b to determine the data freshness. The conversion method depends on whether or not challenge information is received from the authentication method selector 18b.

When the data converter 13b receives challenge information from the authentication method selector 18b, it converts the communication data in such a way that freshness can be verified using the challenge-response method. Specifically, the data converter 13b sends a key request message to the key acquisition unit 11b, and converts the communication data by using the key information received from the key acquisition unit 11b and the challenge information received from the authentication method selector 18b.

When the data converter 13b does not receive challenge information from the authentication method selector 18b, it converts the data in such a way that freshness can be verified using the new key shared with the receiving device 2b and the time varying parameter. Specifically, the data converter 13b transmits a time varying parameter request message to the time varying parameter manager 12b, receives the new key and the time varying parameter from the time varying parameter manager 12b, and uses the new key and time varying parameter to convert the communication data.

Information indicating the conversion method used may be placed in the converted data explicitly. When the time varying parameter is used, the time varying parameter may also be placed in the converted data explicitly. The converted communication data are sent to the transmitter 15b.

The receiver 14b supplies challenge information received from the receiving device 2b to the authentication method selector 18b.

The transmitter 15b transmits key sharing messages received from the key sharing unit 19b and converted communication data received from the data converter 13b to the receiving device 2b.

Figure 10:
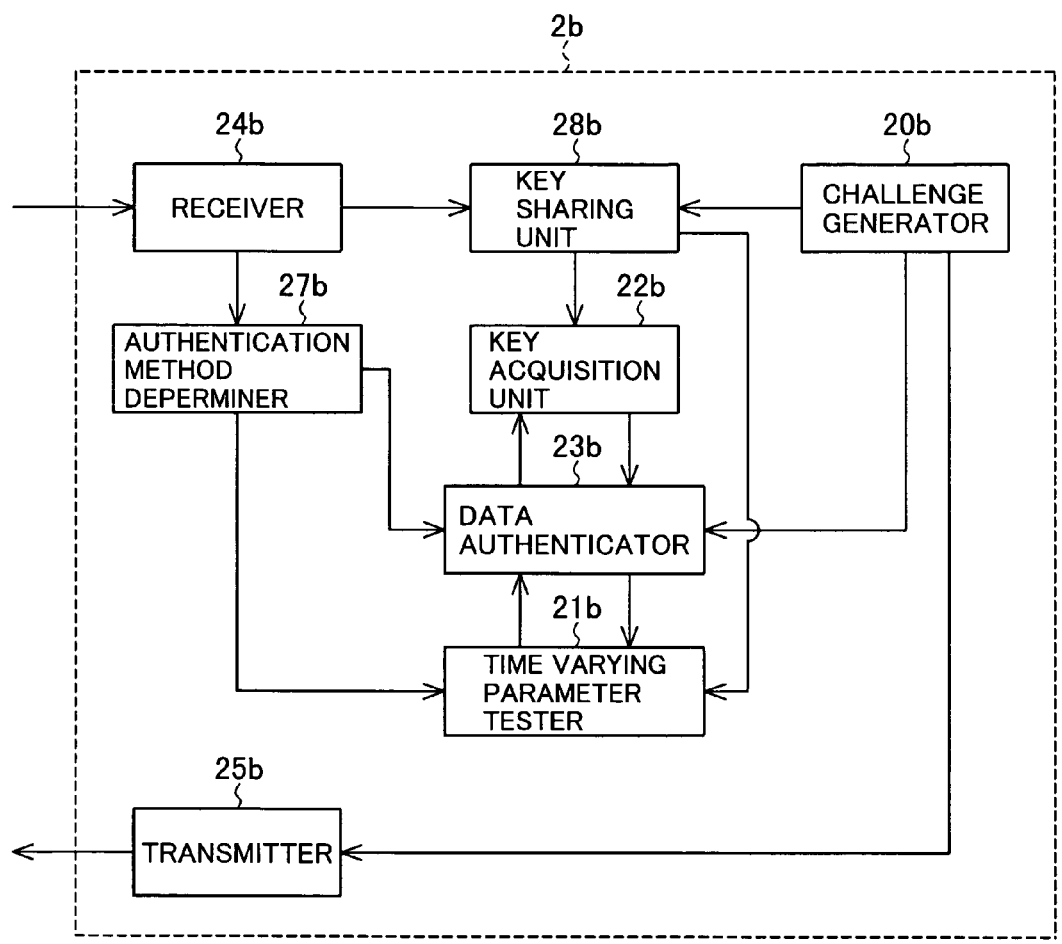
FIG. 10 is a block diagram illustrating the internal structure of the receiving device in the third embodiment.

As shown in FIG. 10, the receiving device 2b includes at least a challenge generator 20b, a time varying parameter tester 21b, a key acquisition unit 22b, a data authenticator 23b, a receiver 24b, a transmitter 25b, an authentication method determiner 27b, and a key sharing unit 28b.

The challenge generator 20b operates as described in the first embodiment, but sends the generated challenge information to the key sharing unit 28b.

The authentication method determiner 27b determines which authentication method the authentication method selector in the transmitting device selected. The authentication method may be determined from information included explicitly in the converted data or information received separately from the transmitting device. When the challenge-response method is used, the authentication method determiner 27b sends converted data to the data authenticator 23b. When the time varying parameter method is used, the authentication method determiner 27b sends the converted data to the time varying parameter tester 21b.

When the key sharing unit 28b receives a key sharing message from the receiver 24b, it generates a new key by using the random number information in the message, the challenge information received from the challenge generator 20b and the existing key information received from the key acquisition unit 22b. The method used by the key sharing unit 28b in the receiving device 2b corresponds to the method used by the key sharing unit 19b in the transmitting device 1b to generate or encrypt the new key, so that the transmitting and receiving devices share the same new key. The key sharing unit 28b sends the new key to the time varying parameter tester 21b.

The key acquisition unit 22b operates as described in the first embodiment, except that it also sends the key information it obtains to the key sharing unit 28b. The key acquisition unit 22b sends the key information to the data authenticator 23b when it receives a key request message from the data authenticator 23b.

The time varying parameter tester 21b operates basically as described in the first embodiment, except that it receives converted data from the authentication method determiner 27b, receives new key information from the key sharing unit 28b, and manages the time varying parameter together with the new key information. The time varying parameter tester 21b also sends the new key information received from the key sharing unit 28b, together with the converted data received from the authentication method determiner 27b, to the data authenticator 23b.

The data authenticator 23b authenticates the received converted data to determine whether the converted data were actually generated by the transmitting device 1b. The data authenticator 23b uses different methods of authenticating converted data received from the authentication method determiner 27b and converted data received from the time varying parameter tester 21b.

For converted data received from the authentication method determiner 27b, the data authenticator 23b uses the challenge-response method. Specifically, the data authenticator 23b sends a key request message to the key acquisition unit 22b, receives a key in return, receives challenge information from the challenge generator 20b, and determines whether, for example, a message authentication code included in the converted data has been generated by use of the challenge information and the key. If so, the converted data are regarded as having been freshly generated by the transmitting device 1b. Otherwise, the converted data are regarded as spurious and may be discarded.

For converted data received from the time varying parameter tester 21b, the data authenticator 23b authenticates the converted data using the time varying parameter and the new key information shared with the transmitting device 1b. In this case, the data authenticator 23b operates as described in the first embodiment except that it uses the new key information received together with the converted data from the time varying parameter tester 21b and does not use challenge information. Authentication succeeds if the data authenticator 23b can verify that the time varying parameter and the new key were used to convert the communication data.

The receiver 24b transfers key sharing messages received from the transmitting device 1b to the key sharing unit 28b, and sends converted data received from the transmitting device 1b to the authentication method determiner 27b.

The transmitter 25b operates as in the first embodiment.

The operation of the communication data freshness confirmation system in the third embodiment will now be described with reference to FIGS. 11 and 12. The communication data freshness confirmation system in the third embodiment can operate in various ways. The following is one example.

(1) A counter value is used as the time varying parameter. The converted data are considered fresh if the counter value used for the data conversion is equal to or greater than the counter value managed by the receiving device 2b.

(2) When there is only one item of communication data to be transmitted, data conversion is carried out by the challenge-response method. The converted data include the communication data and a message authentication code generated from the communication data by use of the existing shared key K and the challenge information.

(3) If the number of items of data to be transmitted is two or more, the communication data are converted by concatenation with the time varying parameter (counter value) and a message authentication code. The message authentication code is generated by using the time varying parameter and a new shared key K' to operate on a data string obtained by concatenating the time varying parameter and the communication data.

(4) The shared key K' is generated from the existing shared key K, the challenge information, and a random number.

(5) The time varying parameter used for data conversion is included in the converted data explicitly (e.g., as plain text). The time varying parameter tester 21b uses the explicitly included time varying parameter to make a provisional freshness determination before the converted data are authenticated.

The operation of the communication data freshness confirmation system in the third embodiment includes at least three initial steps S301-S303 that do not depend on the authentication method and further steps S304-S306 that differ depending on the authentication method.

Figure 11:
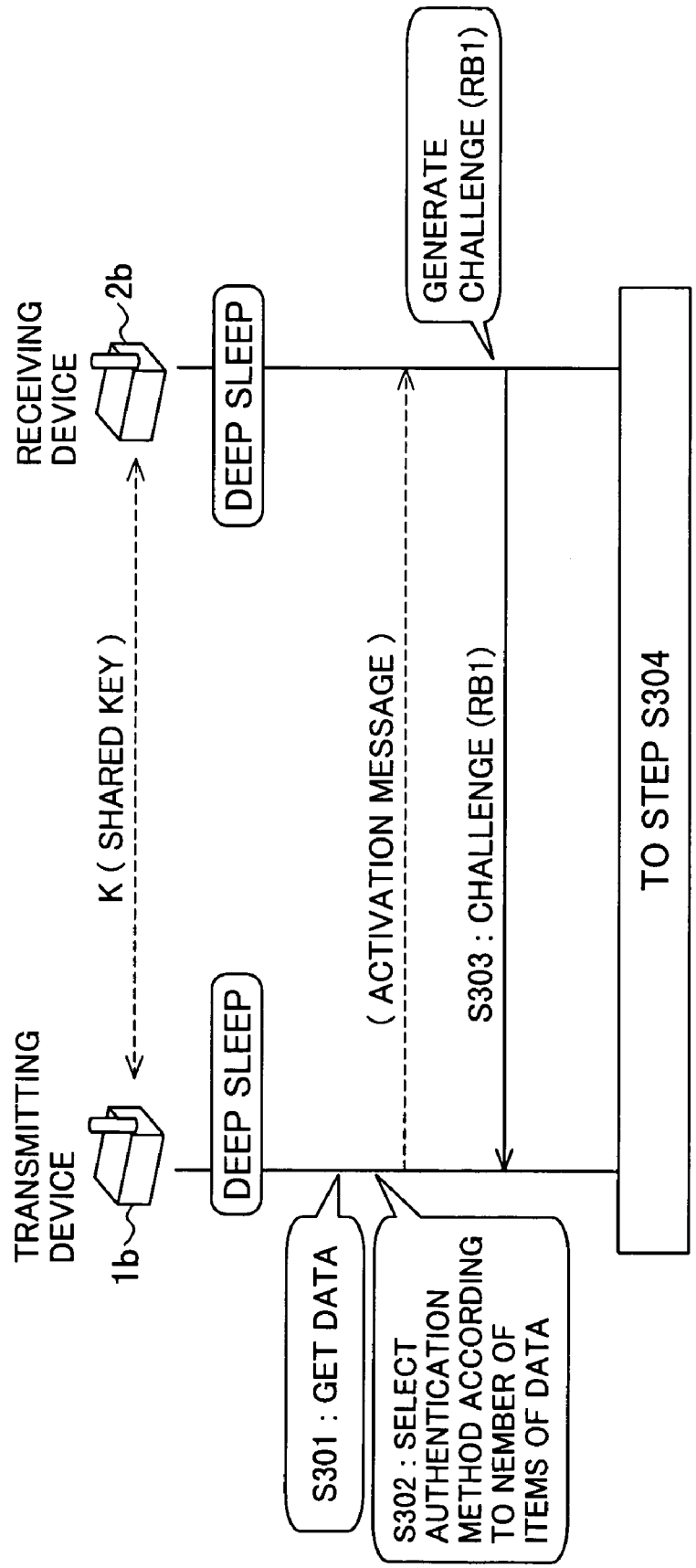
FIGS. 11 and 12 are communication sequence diagrams illustrating the operation of the third embodiment.

Referring to FIG. 11, in step S301 the data acquisition unit 10b in the transmitting device 1b obtains communication data.

In step S302, the authentication method selector 18b in the transmitting device 1b selects the authentication and freshness confirmation method, selecting the challenge-response method if there is only one item of communication data to be sent to the receiving device 2b, and the time varying parameter and new key method if there are two or more items. The transmitting device 1b may also transmit an activation request message to inform the receiving device 2b of the presence of communication data, and may use this message to inform the receiving device 2b of the selected authentication method.

In step S303, the challenge generator 20b in the receiving device 2b generates challenge information RB1 and the transmitter 25b transmits the challenge information to the transmitting device 1b. The authentication method selector 18b in the transmitting device 1b receives the challenge information and takes further action according to the selected authentication and freshness confirmation method.

Figure 12:
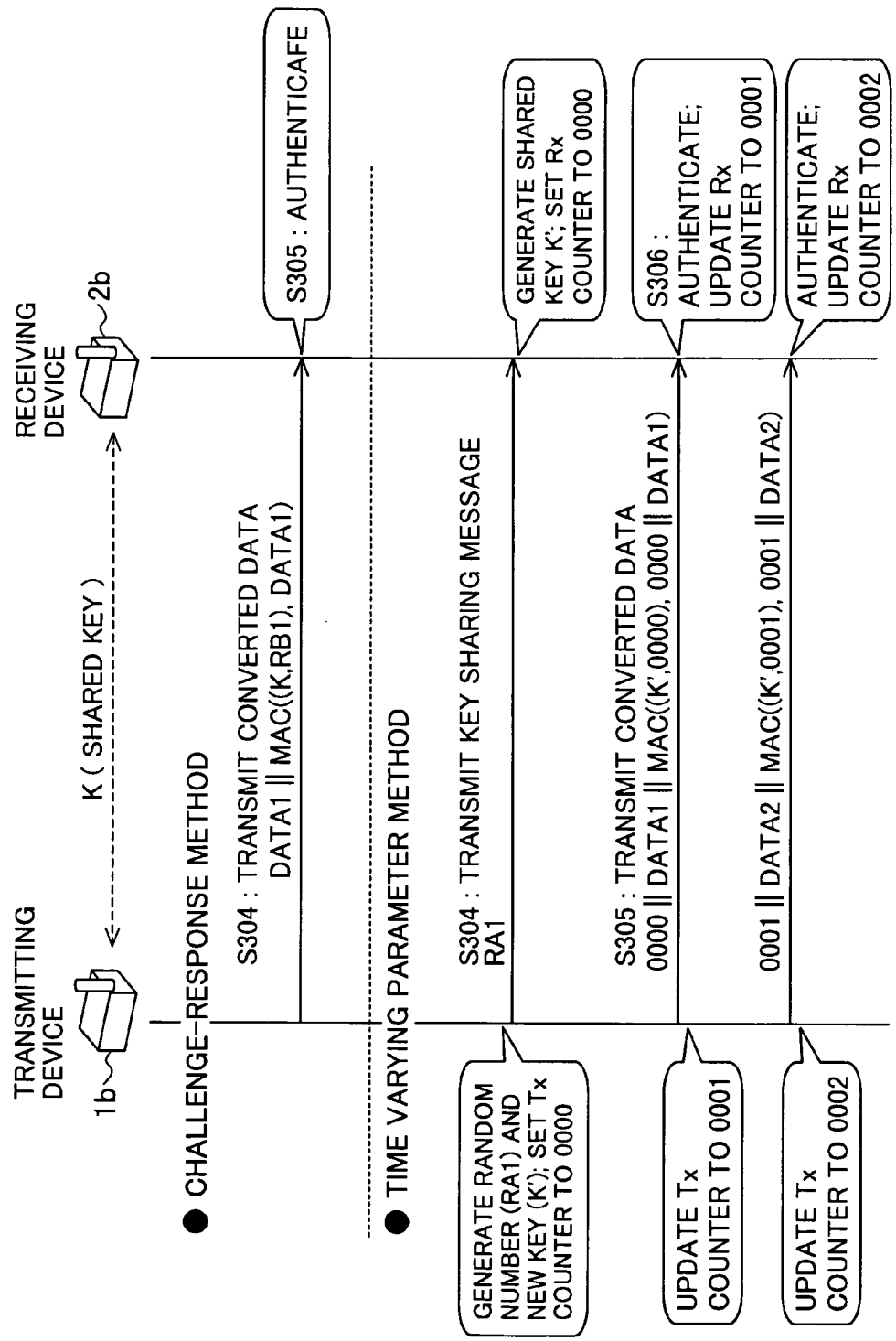

Referring to the upper part of FIG. 12, if the challenge-response method is selected, then in step S304, the authentication method selector 18b passes the received challenge information RB1 to the data converter 13b. The data converter 13b sends a key request message to the key acquisition unit 11b, receives the shared key K, generates a message authentication code by using the shared key K and the challenge information RB1 to operate on the communication data (data-1) received from the data acquisition unit 10b, and generates the converted data by appending the message authentication code to the communication data. If necessary, the data converter 13b may explicitly indicate the authentication method in, for example, the header of the converted data. The transmitter 15b transmits the converted data to the receiving device 2b.

In step S305, the authentication method determiner 27b in the receiving device 2b receives the converted data from the receiver 24b and passes the converted data to the data authenticator 23b. The data authenticator 23b sends a key request message to the key acquisition unit 22b, receives the shared key K, receives the challenge information RB1 from the challenge generator 20b, and determines whether the received converted data have been converted correctly by use of the shared key K and the challenge information RB1. If the received converted data pass this test they are regarded as having been freshly generated by the transmitting device 1b.

Referring to the lower part of FIG. 12, if the time varying parameter and new key method is selected, then in step S304, the authentication method selector 18b passes the received challenge information RB1 to the key sharing unit 19b. The key sharing unit 19*b* then generates random number information RA1, receives the shared key K from the key acquisition unit 11*b* and uses a key generating function F to generate a new shared key K' from the shared key K, the random number information RA1, and the challenge information RB1.

$$K'=F(K, RA1, RB1)$$

The key sharing unit 19*b* also places the random number information RA1 in a key sharing message that the transmitter 15*b* transmits to the receiving device 2*b*, and gives the new shared key K' to the time varying parameter manager 12*b*. The time varying parameter manager 12*b* initializes a transmission counter for the shared key K' to 0000. In the receiving device 2*b*, the key sharing unit 28*b* receives the key sharing message from the receiver 24*b*, regards it as genuine because it is received in response to the challenge, and generates the new shared key K' by using the random number information RA1 included in the key sharing message, the challenge information RB1, which it receives from the challenge generator 20*b*, and the existing shared key K, which it receives from the key acquisition unit 22*b*. The time varying parameter tester 21*b* receives the new shared key K' from the key sharing unit 28*b* and initializes a reception counter associated with the new shared key K' to 0000.

In step S305, the data converter 13*b* in the transmitting device 1*b* receives the first item of communication data (data-1) from the data acquisition unit 10*b*, requests the time varying parameter, and receives the new shared key K' and the transmission counter value 0000 from the time varying parameter manager 12*b*, concatenates the transmission counter value 0000 and data-1 to form a data string, generates a message authentication code from the data string by using the new shared key and generates converted data by appending the message authentication code to the data string. The transmitter 15*b* transmits the converted data to the receiving device 2*b*. The time varying parameter manager 12*b* increments the transmission counter from 0000 to 0001.

In step S306, the receiver 24*b* in the receiving device 2*b* receives the converted data and passes the converted data to the authentication method determiner 27*b*. The authentication method determiner 27*b* sends the converted data to the time varying parameter tester 21*b*. The time varying parameter tester 21*b* compares the transmission counter value included explicitly in the converted data with the reception counter value (0000) managed by the time varying parameter tester 21*b* itself. If the transmission counter value is less than the reception counter value, the time varying parameter tester 21*b* discards the converted data. If the transmission counter value is equal to or greater than the reception counter value, the time varying parameter tester 21*b* provisionally regards the received converted data as fresh and sends the converted data and the new shared key K' to the data authenticator 23*b*.

Although the freshness of the first data is confirmed from the time varying parameter, it is also confirmed indirectly from the challenge information, in that the time varying parameter was initialized when the key sharing message responding to the challenge was received.

The data authenticator 23*b* verifies the correctness of the message authentication code included in the converted data by using the new shared key K' and the transmission counter value (0000) explicitly included in the converted data. If the message authentication code is correct, the data authenticator 23*b* sends an authentication success message to the time varying parameter tester 21*b*, thereby confirming that the received converted data are fresh. The time varying parameter tester 21*b* then recognizes the transmission counter value 0000 included in the converted data as being fresh and sets the reception counter to 0001, which is obtained by incrementing the transmission counter value 0000 by one.

If the message authentication code is incorrect, the data authenticator 23*b* sends an authentication failure message to the time varying parameter tester 21*b*, which discards the received converted data without setting the reception counter.

FIG. 13 illustrates the operation of the communication data freshness confirmation system in the third embodiment when one item of communication data is generated upon recovery from a first deep sleep state and a plurality of items of communication data are generated upon the recovery from the next deep sleep state.

At the beginning of this operation, the transmitting device 1*b* and receiving device 2*b* emerge from respective deep sleep states 50*b* and 60*b*. The transmitting device 1*b* finds that it has just one item of data to be transmitted, and sends an activation request message to the receiving device 2*b* if necessary. The receiving device 2*b* transmits challenge information RB1 to the transmitting device 1*b*. The transmitting device 1*b* transmits converted data obtained from the communication data (data-1) and the challenge information RB1 to the receiving device 2*b*, which authenticates and confirms the freshness of the communication data, as in steps S301 to S303 in FIG. 11 and steps S304 and S305 at the top of FIG. 12.

The transmitting device 1*b* and receiving device 2*b* now return to respective deep sleep states 51*b* and 61*b*. Later they emerge from these deep sleep states and become ready to communicate again. The transmitting device 1*b* now finds that it has at least two items of data to be transmitted. The receiving device 2*b* transmits new challenge information RB2 to the transmitting device 1*b*. These communication steps are similar to steps S301 to S303 in FIG. 11.

The transmitting device 1*b* generates a new shared key K' using the received challenge information RB2, the existing shared key K, and random number information RA1, and transmits the random number information in a key sharing message to the receiving device 2*b*. The receiving device 2*b* uses the random number information RA1 included in the key sharing message, the challenge information RB2, and the existing shared key K to generate a new shared key K' identical to the new shared key generated by the transmitting device 1*b*. The transmitting device 1*b* now generates converted data for the second item of communication data (data-2), using the new shared key and the transmission counter value, and transmits the converted data to the receiving device 2*b*. These communication steps are similar to steps S304 to S306 at the bottom of FIG. 12.

The transmitting device 1*b* then generates converted data for the next item of communication data (data-3) and any subsequent items of communication data, using the new shared key, and transmits the converted data to the receiving device 2*b*. The operations performed are essentially repetitions of steps S305 and S306 at the bottom of FIG. 12.

Like the preceding embodiments, the third embodiment is flexible in selectively using the challenge-response method and the time varying parameter method to confirm the freshness of communication data, and provides an efficient way to confirm data freshness without the need for clock synchronization, without the need to store a time varying parameter value in a nonvolatile memory on each entry to the deep sleep mode, and without the need to generate and transmit challenge information before every data transmission.

Compared with the first and second embodiments, however, when there is only one item of communication to be transmitted between deep sleep periods, the third embodiment shortens the converted data and conserves power and memory space by not setting up or using a time varying parameter. The third embodiment also provides extra security by frequently changing the key.

If the key K used in the first and second embodiments is held in a rewritable nonvolatile memory, it also can be changed from time to time to improve security, but the number of rewrite cycles permitted by existing rewritable nonvolatile memories is limited, so the key K cannot be changed frequently.

The existing key K used in the third embodiment may also be held in a nonvolatile memory and rewritten periodically as a defense against decryption attacks. Compared with the first and second embodiments, however, since the third embodiment frequently uses new keys generated from the existing key and random numbers, decryption analysis is rendered more difficult. To provide a given level of security, the nonvolatile memory does not need to be rewritten as often in the third embodiment as in the first and second embodiments.

Changing keys on recovery from the deep sleep state is a known technique. The technique generally used is for the transmitting and receiving devices to store a shared key in a nonvolatile memory, exchange random number information, use the stored key and the random number information as seed information to generate a new shared key, and then use the new shared key until the next entry into the deep sleep state, at which point the new key is lost. If only one item of communication data is transmitted using the new key, however, the added security gained by changing keys is unlikely to be worth the power consumed in generating the new key. By generating a new key only when there are multiple items of data to transmit, the third embodiment avoids wasting power.

The preceding embodiments have been described with reference to the deep sleep state, but the same data freshness confirmation methods can also be used on recovery from the normal sleep state.

The activation request message shown in the preceding embodiments may be used to transmit information in addition to a request for a challenge. In the third embodiment, for example, the activation request message may indicate the selected authentication method, as noted above, and when the time varying parameter method is selected, the activation request message may also include the random number from which the new key will be generated, so that the activation request message doubles as the key sharing message.

Those skilled in the art will recognize that further variations are possible within the scope of the invention, which is defined in the appended claims.

What is claimed is:

1. A communication data freshness confirmation system comprising:
   a transmitting device; and
   a receiving device that transmits challenge information to the transmitting device; wherein
   upon receiving the challenge information, if the transmitting device has only one item of communication data to transmit to the receiving device, the transmitting device responds to the challenge and transmits single converted data to the receiving device;
   upon receiving the challenge information, if the transmitting device has a first item of communication data and at least one additional item of communication data to transmit to the receiving device, the transmitting device initializes a time varying parameter, uses the time varying parameter to convert the first item of communication data to first converted data and each item of additional communication data to additional converted data, and transmits the first converted data and the additional data to the receiving device, updating the time varying parameter at least after each conversion of the additional communication data; and
   the receiving device uses at least the time varying parameter to confirm freshness of the additional converted data,
   wherein the transmitting device uses the challenge information to convert the only one item of communication data to the single converted data and to convert the first item of communication data to the first converted data and transmits the single converted data to the receiving device in response to the challenge, and the receiving device uses the challenge information to confirm the freshness of the single converted data and the first converted data, and wherein:
   the transmitting device includes
   a data acquisition unit for obtaining the communication data,
   a receiver for receiving the challenge information from the receiving device,
   a key acquisition unit for obtaining key information,
   a time varying parameter manager for receiving the challenge information from the receiver and managing the time varying parameter,
   a data converter for receiving the communication data from the data acquisition unit, the key information from the key acquisition unit, and the challenge information and the time varying parameter from the time varying parameter manager and converting the communication data by using the key information, the challenge information, and the time varying parameter to generate the single, first and additional converted data, and
   a transmitter for receiving the single, first , and additional converted data from the data converter and transmitting the single, first, and additional converted data to the receiving device; and
   the receiving device includes
   a challenge generator for generating the challenge information,
   a transmitter for receiving the challenge information from the challenge generator and transmitting the challenge information to the transmitting device,
   a receiver for receiving the single, first, and additional converted data from the transmitting device,
   a key acquisition unit for obtaining key information identical to the key information obtained by the key acquisition unit in the transmitting device,
   a time varying parameter tester for receiving the single, first, and additional converted data from the receiver and testing the freshness of the single, first and additional converted data, and
   a data authenticator for receiving the single, first, and additional converted data from the time varying parameter tester, the key information from the key acquisition unit in the receiving device, and the challenge information from the challenge generator, authenticating the single, first, and additional converted data by using the key information and at least one of the challenge information and the time varying information to determine whether the converted data were converted correctly, and sending an authentication result to the time varying parameter tester; wherein
   the time varying parameter tester uses the authentication result to confirm the freshness of the single, first, and additional converted data.

2. The communication data freshness confirmation system of claim 1, wherein:

the time varying parameter manager receives different items of challenge information from the receiver and manages a different time varying parameter for each item of challenge information; and the data converter uses each item of challenge information to convert an arbitrary number of items of the communication data.

3. The communication data freshness confirmation system of claim 1, wherein:

the data authenticator uses the challenge information to authenticate the single converted data, sends an authentication success message as the authentication result if the single converted data were derived correctly, and sends an authentication failure message as the authentication result if the single converted data were derived incorrectly; and the data authenticator uses the key information and at least the challenge information to authenticate the first converted data, sends the authentication success message as the authentication result if the first converted data were derived correctly, and sends the authentication failure message as the authentication result if the first converted data were derived incorrectly; and the data authenticator uses the key information and at least the time varying parameter to authenticate each item of the additional converted data, sends the authentication success message as the authentication result if the additional converted data were derived correctly, and sends the authentication failure message as the authentication result if the additional converted data were derived incorrectly; and the time varying parameter tester determines the single, first, and additional converted data to be fresh by receiving the authentication success message, and determines the single, first, and additional converted data and each item of additional converted data not, to be fresh by receiving the authentication failure message.

4. The communication data freshness confirmation system of claim 3, wherein to authenticate each item of the additional converted data, the data authenticator uses either a value of the time varying parameter included explicitly in the additional converted data or a value inferred to have been used by the data converter in the transmitting device.

5. The communication data freshness confirmation system of claim 3, wherein the time varying parameter is explicitly included in each item of the additional converted data, the time varying parameter tester compares the explicitly included time varying parameter with a time varying parameter managed by the time varying parameter tester itself to make a provisional freshness determination, and sends the additional converted data to the data authenticator only if the explicitly included time varying parameter is provisionally determined to be fresh.

6. A communication data freshness confirmation system comprising:

a transmitting device; and a receiving device that transmits challenge information to the transmitting device; wherein upon receiving the challenge information, is the transmitting device has only one item of communication data to transmit to the receiving device, the transmitting device responds to the challenge and transmits single converted data to the receiving device;

upon receiving the challenge information, if the transmitting device has a first item of communication data and at least one additional item of communication data to transmit to the receiving device, the transmitting device initializes a time varying parameter, uses the time varying parameter to convert the first item of communication data to first converted data and each item of additional communication data to additional converted data, and transmits the first converted data and the additional data to the receiving device, updating the time varying parameter at least after each conversion of the additional communication data; and the receiving device uses at least the tie varying parameter to confirm freshness of the additional converted data, wherein the transmitting device responds to the challenge by transmitting a time varying parameter notification message including a starting value of the time varying parameter to the receiving device, and wherein:

the transmitting device includes a data acquisition unit for obtaining the communication data, a receiver for receiving the challenge information from the receiving device, a key acquisition unit for obtaining key information, a time varying parameter acquisition unit for obtaining the starting value, different starting values being obtained at different times, a time varying parameter notification unit for receiving the key information from the key acquisition unit, the challenge information from the receiver, and the starting value from the time varying parameter acquisition unit, and converting at least the starting value by using the key information and the challenge information to generate the time varying parameter notification message, a time varying parameter manager for receiving the starting value from the time varying parameter acquisition unit, initializing the time varying parameter according to the starting value, and managing the time varying parameter, a data converter for receiving the communication data from the data acquisition unit, the key information from the key acquisition unit, and the time varying parameter from the time varying parameter manager, and converting the communication data by using the key information and the time varying parameter to generate the converted data, the first converted data, and the additional converted data, and a transmitter for receiving the time varying parameter notification message from the time varying parameter notification unit, receiving the converted data from the data converter, and transmitting the time varying parameter notification message and the converted data to the receiving device; and the receiving device includes a challenge generator for generating the challenge information, a transmitter for receiving the challenge information from the challenge generator and transmitting the challenge information to the transmitting device, a receiver for receiving the challenge information and the converted data from the transmitting device, a key acquisition unit for obtaining key information identical to the key information obtained by the key acquisition unit in the transmitting device, a time varying parameter tester for receiving the converted data from the receiver and testing freshness of the converted data, a time varying parameter synchronization unit for receiving the time varying parameter notification message from the receiver, the key information from the key acquisition unit in the receiving device, and the challenge information from the challenge generator, authenticating the time varying parameter notification message by using the key information and the challenge information to determine whether the time varying parameter notification message was generated correctly or not, obtaining at least the time varying parameter from the time varying parameter notification message, and sending the time varying parameter to the time varying parameter tester, and a data authenticator for receiving at least the additional converted data from the time varying parameter tester and the key information from the key acquisition unit in the receiving device, authenticating the converted data by using the key information and the time varying parameter to determine whether the converted data were converted correctly, and sending an authentication result to the time varying parameter tester, wherein the time varying parameter tester uses the authentication result to confirm the freshness of the converted data.

7. The communication data freshness confirmation system of claim 6, wherein time varying parameter notification unit also places the first or only one item of communication data in the time varying notification message, and by authenticating the time varying notification message, the time varying parameter synchronization unit also authenticates and tests the freshness of the first or only one item of communication data.

8. The communication data freshness confirmation system of claim 6, wherein:

the data authenticator also receives the single and first converted data from the time varying parameter tester, authenticates the single and first converted data by determining whether the single and first converted data were converted correctly, sends an authentication success message as the authentication result if the single converted data were derived correctly, sends an authentication success message as the authentication result if the first converted data were derived correctly, sends an authentication success message as the authentication result if the additional converted data were derived correctly, and sends an authentication failure message as the authentication result if the first, single, or additional converted data were converted incorrectly; and the time varying parameter tester determines the converted data to be fresh by receiving the authentication success message, and determines the converted data not to be fresh by receiving the authentication failure message.

9. The communication data freshness confirmation system of claim 8, wherein when the time varying parameter is explicitly included in the single and first converted data, and in authenticating the single and first converted data, the data authenticator uses the explicitly included time varying parameter.

10. The communication data freshness confirmation system of claim 6, wherein the time varying parameter is explicitly included in the additional converted data, the time varying parameter tester compares the explicitly included time varying parameter with a time varying parameter managed by the time varying parameter tester itself to make a provisional freshness determination, and sends the additional converted data to the data authenticator only if the explicitly included time varying parameter is provisionally determined to be fresh.

11. The communication data freshness confirmation system of claim 6, wherein the time varying parameter acquisition unit obtains the time varying parameter by measuring elapsed time from commencement of usage of the key information.

12. A communication data freshness confirmation system comprising:

a transmitting device; and a receiving device that transmits challenge information to the transmitting device; wherein upon receiving the challenge information, if the transmitting device has only one item of communication data to transmit to the receiving device, the transmitting device responds to the challenge and transmits single converted data to the receiving device;

upon receiving the challenge information, if the transmitting device has a first item of communication data and at least one additional item of communication data to transmit to the receiving device, the transmitting device initializes a time varying parameter, uses the time varying parameter to convert the first time of communication data to first converted data and each item of additional communication data to additional converted data, and transmits the first converted data and the additional data to the receiving device, updating the time varying parameter at least after each conversion of the additional communication data; and the receiving device uses at least the time varying parameter to confirm freshness of the additional converted data, wherein the transmitting device responds to the challenge in one way when there is only the one item of communication data to be transmitted to the receiving device and in another way when there are the first item and the at least one additional item of communication data to be transmitted to the receiving device, and wherein:

the transmitting device includes a data acquisition unit for obtaining the communication data, a receiver for receiving the challenge information from the receiving device, a key acquisition unit for obtaining key information, an authentication method selector for receiving the challenge information from the receiver, receiving the communication data from the data acquisition unit, and selecting a first authentication method when there is only one item of communication data, and selecting a second authentication method when the communication data includes the first item and the at least one additional item of communication data, a key sharing unit for receiving the key information from the key acquisition unit, receiving the challenge information from the authentication method selector, and generating new key information from the key information, the challenge information, and random number information generated by the key sharing unit itself, a time varying parameter manager for receiving the new key information from the key sharing unit, setting the time varying parameter, and managing the time varying parameter in correspondence to the new key information, a data converter for receiving the communication data from the data acquisition unit, converting the communication data to the single converted data by using the key information received from the key acquisition unit and the challenge information received from the authentication method selector when the authentication method selector selects the first authentication method, and converting the communication data to the first and additional communication data by using the new key information and the time varying parameter received from the time varying parameter manager when the authentication method selector selects the second authentication method, and a transmitter for receiving the single, first, and additional converted data from the data converter, receiving a key sharing message including at least the random number information from the key sharing unit, and transmitting the single, first, and additional converted data and the key sharing message to the receiving device; and the receiving device includes a challenge generator for generating the challenge information, a transmitter for receiving the challenge information from the challenge generator and transmitting the challenge information to the transmitting device, a receiver for receiving the single, first, and additional converted data and the key sharing message from the transmitting device, a key acquisition unit for obtaining key information identical to the key information obtained by the key acquisition unit in the transmitting device, an authentication method determiner for receiving the single, first, and additional converted data from the receiver and determining the authentication method selected by the authentication method selector in the transmitting device from information included in the single and first converted data or information transmitted separately by the transmitting device, a key sharing unit for receiving the key information from the key acquisition unit in the receiving device, the challenge information from the challenge generator, and the key sharing message from the receiver, and generating new key information identical to the new key information generated by key sharing unit in the transmitting device by using the key information, the challenge information, and the key sharing message, a time varying parameter tester for receiving the new key information from the key sharing unit, receiving the single, first, and additional converted data from the authentication method determiner, and testing freshness of the single, first, and additional converted data, and a data authenticator for receiving the converted data from one of the authentication method determiner and the time varying parameter tester, receiving the new key information from the key acquisition unit, receiving the new key information from the time varying parameter tester, receiving the challenge information from the challenge generator, authenticating the converted data by using at least one of the challenge information, the key information, the new key information, and the time varying parameter to determine whether the converted data have been converted correctly, and sending an authentication result to the time varying parameter tester, wherein the time varying parameter tester uses the authentication result to confirm the freshness of the converted data.

13. The communication data freshness confirmation system of claim 12, wherein, when the data acquisition unit obtains only the one item of communication data:

the data converter converts the one item of communication data by using the key information received from the key acquisition unit in the transmitting device and the challenge information received from the authentication method selector to generate the single converted data; and the data authenticator authenticates the single converted data by using the challenge information and the key information.

14. The communication data freshness confirmation system of claim 12, wherein, when the data acquisition unit obtains a plurality of items of communication data including the first item of communication data and the at least one additional item of communication data:

the data converter converts each item of communication data by using the new key information and the time varying parameter received from the time varying parameter manager to generate the first and additional converted data;

the data authenticator authenticates the first and additional converted data by using the new key information and the time varying parameter to determine whether the first and additional converted data were converted correctly, sends an authentication success message as the authentication result if the first and additional converted data were converted correctly, and sends an authentication failure message as the authentication result if the converted data were converted incorrectly; and the time varying parameter tester determines the converted data to be fresh by receiving the authentication success message, and determines the converted data not to be fresh by receiving the authentication failure message.

15. The communication data freshness confirmation system of claim 12, wherein the time varying parameter is explicitly included in the first and additional converted data, the time varying parameter tester compares the explicitly included time varying parameter with a time varying parameter managed by the time varying parameter tester itself to make a provisional freshness determination, and sends the first and additional converted data to the data authenticator only if the explicitly included time varying parameter is provisionally determined to be fresh.

16. The communication data freshness confirmation system of claim 1, wherein the converted data are obtained by adding a message authentication code to the communication data or by encrypting the communication data.

17. A communication device including the transmitting device in the communication data freshness confirmation system of claim 1.

18. A communication device including the receiving device in the communication data freshness confirmation system of claim 1.

* * * * *